(12) United States Patent
Hur

(10) Patent No.: US 12,273,557 B2
(45) Date of Patent: Apr. 8, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/857,773

(22) Filed: Jul. 5, 2022

(65) Prior Publication Data

US 2023/0045663 A1 Feb. 9, 2023

(30) Foreign Application Priority Data

Jul. 5, 2021 (KR) ........................ 10-2021-0087762

(51) Int. Cl.
*H04N 19/537* (2014.01)
*G06T 9/00* (2006.01)
*H04N 19/527* (2014.01)
*H04N 19/577* (2014.01)

(52) U.S. Cl.
CPC ............. *H04N 19/537* (2014.11); *G06T 9/00* (2013.01); *H04N 19/527* (2014.11); *H04N 19/577* (2014.11)

(58) Field of Classification Search
CPC .. H04N 19/537; H04N 19/527; H04N 19/577; G06T 9/00
See application file for complete search history.

(56) References Cited

U.S. PATENT DOCUMENTS

| 2019/0087979 A1* | 3/2019 | Mammou ............ H04N 19/597 |
| 2020/0258262 A1* | 8/2020 | Lasserre .................. G06T 9/00 |
| 2021/0112240 A1* | 4/2021 | Aflaki Beni ........... H04N 19/46 |
| 2021/0192798 A1 | 6/2021 | Lasserre et al. |

(Continued)

FOREIGN PATENT DOCUMENTS

| KR | 20180037338 | 4/2018 |
| WO | WO2020141260 | 7/2020 |

(Continued)

OTHER PUBLICATIONS

International Search Report in International Appln. No. PCT/KR2022/009672, dated Oct. 18, 2022, 22 pages (with English translation).

(Continued)

*Primary Examiner* — Sing-Wai Wu
*Assistant Examiner* — Khoa Vu
(74) *Attorney, Agent, or Firm* — Fish & Richardson P.C.

(57) ABSTRACT

Disclosed herein is a method of transmitting point cloud data. The method may include encoding geometry data of the point cloud data, encoding attribute data of the point cloud data based on the geometry data, and transmitting the encoded geometry data, the encoded attribute data and signaling data, the geometry encoding includes splitting the geometry data into one or more prediction units, and inter-prediction encoding the geometry data by selectively applying a motion vector to each of the split prediction units, and the signaling data includes information for identifying whether the motion vector is applied for each prediction unit.

12 Claims, 37 Drawing Sheets

(56) References Cited

U.S. PATENT DOCUMENTS

| | | | |
|---|---|---|---|
| 2022/0084278 A1* | 3/2022 | Das | G06T 15/20 |
| 2022/0107391 A1* | 4/2022 | Ren | G06V 20/58 |
| 2023/0026080 A1* | 1/2023 | Guede | H04N 19/20 |
| 2023/0230286 A1* | 7/2023 | Sugio | G06T 7/90 |
| | | | 382/232 |
| 2023/0401754 A1* | 12/2023 | Champel | H03M 7/70 |
| 2023/0409149 A1* | 12/2023 | Sommerville | G06F 3/0426 |
| 2024/0187631 A1* | 6/2024 | Lasserre | H04N 19/46 |

FOREIGN PATENT DOCUMENTS

| | | |
|---|---|---|
| WO | WO2020197966 | 10/2020 |
| WO | 2020/075781 A1 | 9/2021 |

OTHER PUBLICATIONS

WG 7 & MPEG 3D Graphics Coding, "G-PCC codec description," International Organization for Standardization, ISO/IEC JTC 1/SC 29/WG 7 N 0011, Oct. 2020, 148 pages.

Convenor, ISO/IEC JTC 1/SC 29/WG 11, "G-PCC codec description v8," XP030292244, International Organisation for Standardisation, ISO/IEC JTC1/SC29/WG11, N19525, Online, Oct. 2020, 140 pages.

Extended European Search Report in European Appln. No. 22837933.5, mailed on Jun. 21, 2024, 8 pages.

Hur, "[G-PCC] [EE13.2 related] on Global Motion Estimation and Compensation," XP030296854, International Organisation For Standardisation, ISO/IEC JTC1/SC29/WG7, m57316, Online, Jul. 2021, 5 pages.

Lasserre et al., "m56271—The (early) history of the GPCC ETM," XP030291383, Motion Picture Expert Group, ISO/IEC JTC1/SC29/WG7, m56271, Online, Jan. 2021, 30 pages.

Van et al., "[G-PCC][EE13.2 related][New Proposal] Improved global motion estimation forG-PCC," XP030291073, International Organisation for Standardisation, ISO/IEC JTC1/SC29/WG7, m56113_v3, Online, Jan. 2021, 11 pages.

Office Action in Japanese Appln. No. 2024-500326, mailed on Jan. 21, 2025, 11 pages (with English translation).

* cited by examiner

FIG. 7
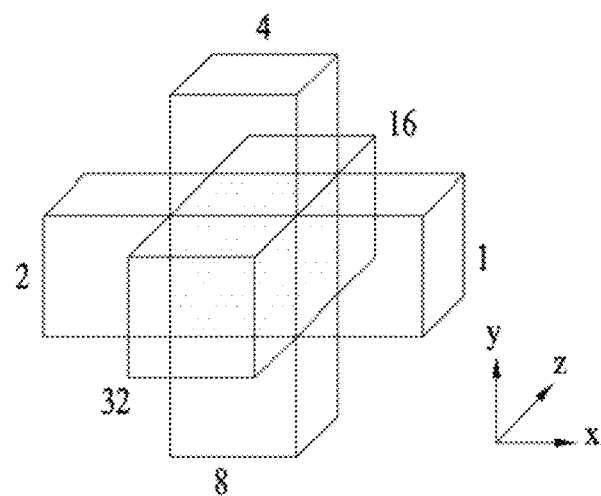
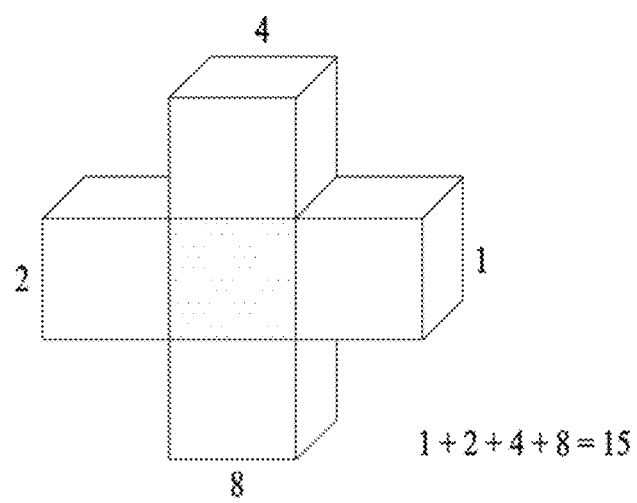
$1+2+4+8=15$

FIG. 19
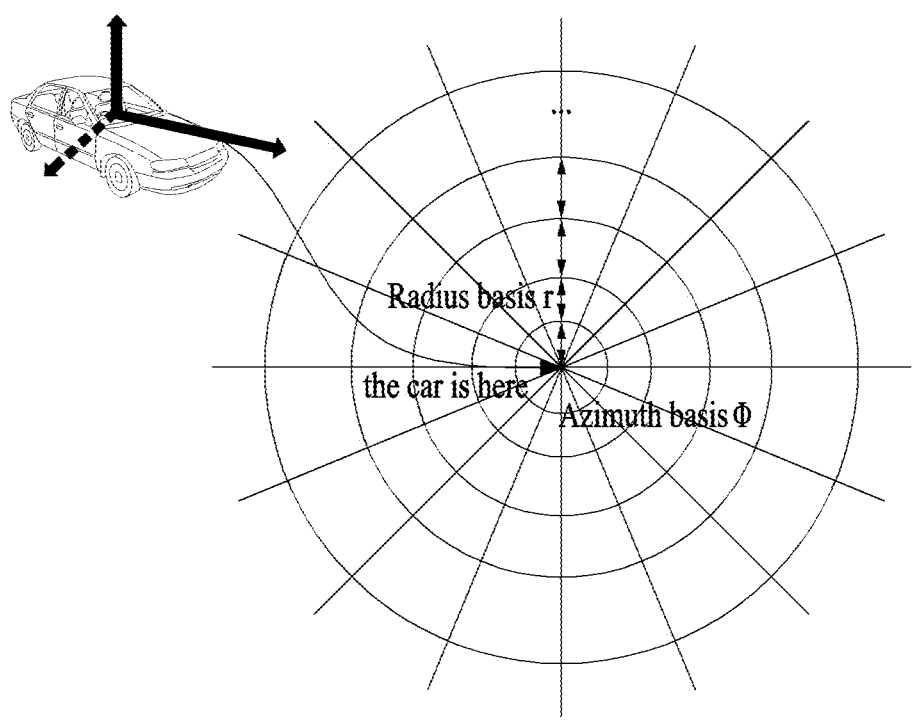
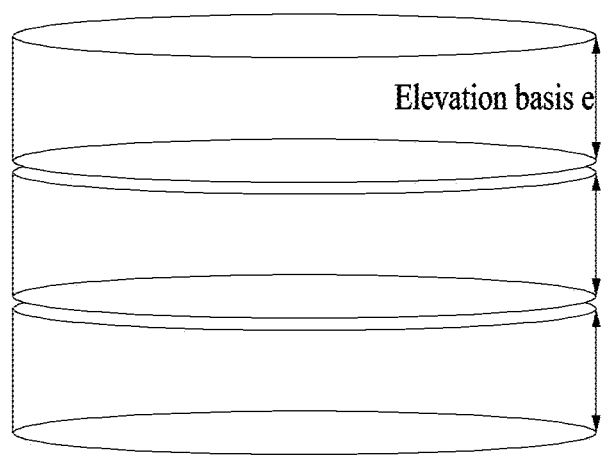

FIG. 26

| S P S | G P S | A P S 0 | A P S 1 | T P S | Slice 0 | | | | | | | | |
|---|---|---|---|---|---|---|---|---|---|---|---|---|---|
| | | | | | Geom 0 | | | | Attr 0 | | | | Attr1 |
| | | | | | Geom slice header | Geom PU0 | Geom PU1 | ... | Attr slice header | Attr PU0 | Attr PU1 | ... | |
| | | | | | | Geom Pu header | Geom Pu data | | | Attr PU header | Attr PU data | | |

FIG. 27

| | Descriptor |
|---|---|
| seq_parameter_set( ) { | |
|   main_profile_compatibility_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i < sps_num_attribute_sets; i++ ) { | |
|     attribute_dimension_minus1[ i ] | ue(v) |
|     attribute_instance_id[ i ] | ue(v) |
|     if(attribute_dimension_minus1[ i ] > 0 ) | |
|       attribute_secondary_bitdepth_minus1[ i ] | ue(v) |
|       attribute_cicp_colour_primaries[ i ] | ue(v) |
|       attribute_cicp_transfer_characteristics[ i ] | ue(v) |
|       attribute_cicp_matrix_coeffs[ i ] | ue(v) |
|       attribute_cicp_video_full_range_flag[ i ] | u(1) |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
|   log2_max_frame_idx | u(5) |
|   axis_coding_order | u(3) |
|   sps_bypass_stream_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

FIG. 28

| | Descriptor |
|---|---|
| geometry_parameter_set( ) { | |
|   gps_geom_parameter_set_id | ue(v) |
|   gps_seq_parameter_set_id | ue(v) |
|   gps_box_present_flag | u(1) |
|   if( gps_box_present_flag ){ | |
|     gps_gsh_box_log2_scale_present_flag | u(1) |
|     if( gps_gsh_box_log2_scale_present_flag == 0 ) | |
|       gps_gsh_box_log2_scale | ue(v) |
|   } | |
|   unique_geometry_points_flag | u(1) |
|   geometry_planar_mode_flag | u(1) |
|   if( geometry_planar_mode_flag ){ | |
|     geom_planar_mode_th_idcm | ue(v) |
|     geom_planar_mode_th[ 1 ] | ue(v) |
|     geom_planar_mode_th[ 2 ] | ue(v) |
|   } | |
|   geometry_angular_mode_flag | u(1) |
|   if( geometry_angular_mode_flag ){ | |
|     lidar_head_position[0] | se(v) |
|     lidar_head_position[1] | se(v) |
|     lidar_head_position[2] | se(v) |
|     number_lasers | ue(v) |
|     for( i = 0; i < number_lasers; i++ ) { | |
|       laser_angle[ i ] | se(v) |
|       laser_correction[ i ] | se(v) |
|     } | |
|     planar_buffer_disabled | u(1) |
|     implicit_qtbt_angular_max_node_min_dim_log2_to_split_z | se(v) |
|     implicit_qtbt_angular_max_diff_to_split_z | se(v) |
|   } | |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   geom_scaling_enabled_flag | u(1) |
|   if( geom_scaling_enabled_flag ) | |
|     geom_base_qp | ue(v) |
|   gps_implicit_geom_partition_flag | u(1) |
|   if( gps_implicit_geom_partition_flag ) { | |
|     gps_max_num_implicit_qtbt_before_ot | ue(v) |
|     gps_min_size_implicit_qtbt | ue(v) |
|   } | |
|   gps_extension_flag | u(1) |
|   if( gps_extension_flag ) | |
|     while( more_data_in_byte_stream( ) ) | |
|       gps_extension_data_flag | u(1) |
|   byte_alignment( ) | |
| } | |

FIG. 29

| geometry_parameter_set_rbsp( ) { | Descriptor |
|---|---|
| gps_geom_parameter_set_id | ue(v) |
| gps_seq_parameter_set_id | ue(v) |
| geom_tree_type | u(2) |
| ... | |
| // for LPU | |
| motion_block_lpu_split_type | u(2) |
| if (motion_block_lpu_split_type == 0) | |
|   motion_block_lpu_radius | ue(v) |
| else if (motion_block_lpu_split_type == 1) | |
|   motion_block_lpu_azimuth | ue(v) |
| else if (motion_block_lpu_split_type == 2) | |
|   motion_block_lpu_elevation | ue(v) |
| // for PU | |
| if (geom_tree_type == 0) | |
|   motion_block_pu_split_octree_type | u(4) |
| else | |
|   motion_block_pu_split_type | u(4) |
|   motion_block_pu_radius | ue(v) |
|   motion_block_pu_azimuth | ue(v) |
|   motion_block_pu_elevation | ue(v) |
|   motion_block_pu_min_radius | ue(v) |
|   motion_block_pu_min_azimuth | ue(v) |
|   motion_block_pu_min_elevation | ue(v) |
| ... | |
|   byte_alignment( ) | |
| } | |

FIG. 30

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| } | |
| byte_alignment( ) | |
| } | |

FIG. 31

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| ... | |
| // for LPU | |
| motion_block_lpu_split_type | u(2) |
| if (motion_block_lpu_split_type == 0) | |
| motion_block_lpu_radius | ue(v) |
| else if (motion_block_lpu_split_type == 1) | |
| motion_block_lpu_azimuth | ue(v) |
| else if (motion_block_lpu_split_type == 2) | |
| motion_block_lpu_elevation | ue(v) |
| // for PU | |
| if (geom_tree_type == 0) | |
| motion_block_pu_split_octree_type | u(4) |
| else | |
| motion_block_pu_split_type | u(4) |
| motion_block_pu_radius | ue(v) |
| motion_block_pu_azimuth | ue(v) |
| motion_block_pu_elevation | ue(v) |
| motion_block_pu_min_radius | ue(v) |
| motion_block_pu_min_azimuth | ue(v) |
| motion_block_pi-min_elevation | ue(v) |
| ... | |
| } | |
| byte_alignment( ) | |
| } | |

FIG. 32

| geometry_slice_bitstream( ) { | Descriptor |
|---|---|
|    geometry_slice_header( ) _tiles | |
|    geometry_slice_data( ) | |
| } | |

FIG. 33

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
|   if( gps_gsh_box_log2_scale_present_flag ) | |
|     gsh_box_log2_scale | ue(v) |
|   gsh_box_origin_x | ue(v) |
|   gsh_box_origin_y | ue(v) |
|   gsh_box_origin_z | ue(v) |
| } | |
| if ( gps_implicit_geom_partition_flag ) { | |
|   gsh_log2_max_nodesize_x | ue(v) |
|   gsh_log2_max_nodesize_y_minus_x | se(v) |
|   gsh_log2_max_nodesize_z_minus_y | se(v) |
| } else { | |
|   gsh_log2_max_nodesize | ue(v) |
| } | |
| if( geom_scaling_enabled_flag ) { | |
|   geom_slice_qp_offset | se(v) |
|   geom_octree_qp_offsets_enabled_flag | u(1) |
|   if( geom_octree_qp_offsets_enabled_flag ) | |
|     geom_octree_qp_offsets_depth | ue(v) |
|   } | |
|   byte_alignment( ) | |
| } | |

FIG. 34

| geometry_slice_header( ) { | Descriptor |
|---|---|
| gsh_geometry_parameter_set_id | ue(v) |
| gsh_tile_id | ue(v) |
| gsh_slice_id | ue(v) |
| ... | |
| // for LPU | |
| motion_block_lpu_split_type | u(2) |
| if (motion_block_lpu_split_type == 0) | |
| motion_block_lpu_radius | ue(v) |
| else if (motion_block_lpu_split_type == 1) | |
| motion_block_lpu_azimuth | ue(v) |
| else if (motion_block_lpu_split_type == 2) | |
| motion_block_lpu_elevation | ue(v) |
| // for PU | |
| if (geom_tree_type == 0) | |
| motion_block_pu_split_octree_type | u(4) |
| else | |
| motion_block_pu_split_type | u(4) |
| motion_block_pu_radius | ue(v) |
| motion_block_pu_azimuth | ue(v) |
| motion_block_pu_elevation | ue(v) |
| motion_block_pu_min_radius | ue(v) |
| motion_block_pu_min_azimuth | ue(v) |
| motion_block_pu_min_elevation | ue(v) |
| } | |
| byte_alignment( ) | |
| } | |

FIG. 35

| geom_pu_header( ) { | Descriptor |
|---|---|
| pu_tile_id | ue(v) |
| pu_slice_id | ue(v) |
| pu_cnt | u(16) |
| for( puIdx =0; puIdx < pu_cnt; puIdx++) { | |
|     pu_id[puIdx] | ue(v) |
|     pu_split_flag | u(1) |
|     pu_motion_compensation_type | u(2) |
|     pu_has_motion_vector_flag | u(1) |
|     if (pu_has_motion_vector_flag == 1) { | |
|         for (k=0; k<3; k++) | |
|             pu_motion_vector_xyz[pu_id][ k ] | se(v) |
|         } | |
|   } | |
|   ... | |
|   byte_alignment( ) | |
| } | |

FIG. 36

| attribute_slice_bitstream( ) { | Descriptor |
|---|---|
|    attribute_slice_header( ) | |
|    attribute_slice_data( ) | |
| } | |

FIG. 37

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   if( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

Pursuant to 35 U.S.C. § 119(e), this application claims the benefit of earlier filing date and right of priority to Korean Application No. 10-2021-0087762, filed on Jul. 5, 2021, the contents of which are hereby incorporated by reference herein in their entirety.

TECHNICAL FIELD

Embodiments relate to a method and apparatus for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

SUMMARY

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for improving the compression performance of the point cloud by improving the technique of encoding attribute information of geometry-based point cloud compression (G-PCC).

Another object of the present disclosure is to provide a point cloud data transmission device, a point cloud data transmission method, a point cloud data reception device, and a point cloud data reception method for efficiently compressing and transmitting point cloud data captured by LiDAR equipment and receiving the same.

Another object of the present disclosure is to provide a point cloud data transmission device, a point cloud data transmission method, a point cloud data reception device, and a point cloud data reception method for efficient inter prediction compression of point cloud data captured by LiDAR equipment.

Another object of the present disclosure is to provide a point cloud data transmission device, a point cloud data transmission method, a point cloud data reception device, and a point cloud data reception method for splitting point cloud data into specific units for efficient inter prediction compression of point cloud data captured by LiDAR equipment.

Another object of the present disclosure is to provide a point cloud data transmission device, a point cloud data transmission method, a point cloud data reception device, and a point cloud data reception method for splitting point cloud data into specific units for efficient inter prediction compression of point cloud data captured by LiDAR equipment, and then selectively applying a motion vector to each split unit.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data according to embodiments may include encoding geometry data of point cloud data, encoding attribute data of the point cloud data based on the geometry data, and transmitting the encoded geometry data, the encoded attribute data and signaling data.

In an embodiment, the geometry encoding may include splitting the geometry data into one or more prediction units and inter-prediction encoding the geometry data by selectively applying a motion vector to each of the split prediction units.

In an embodiment, the signaling data may include information for identifying whether the motion vector is applied for each prediction unit.

In an embodiment, the motion vector may be a global motion vector obtained by estimating motion between consecutive frames.

In an embodiment, the point cloud data is captured by a LiDAR including one or more lasers.

In an embodiment, the geometry data is split into one or more prediction units based on elevation or vertical.

In an embodiment, the signaling data may further include information for identifying a magnitude of the elevation corresponding to a reference for splitting the prediction units.

A point cloud data transmission device according to embodiments may include a geometry encoder configured to encode geometry data of point cloud data, an attribute encoder configured to encode attribute data of the point cloud data based on the geometry data, and a transmitter configured to transmit the encoded geometry data, the encoded attribute data and signaling data.

In an embodiment, the geometry encoder may include a splitter configured to split the geometry data into one or more prediction units, and an inter-predictor configured to inter-prediction-encode the geometry data by selectively applying a motion vector for each of the split prediction units.

In an embodiment, the signaling data may include information for identifying whether the motion vector is applied for each prediction unit.

In an embodiment, the motion vector is a global motion vector obtained by estimating motion between consecutive frames.

In an embodiment, the point cloud data is captured by a LiDAR including one or more lasers.

In an embodiment, the geometry data is split into one or more prediction units based on elevation or vertical.

In an embodiment, the signaling data may further include information for identifying a magnitude of the elevation corresponding to a reference for splitting the prediction units.

A method of receiving point cloud data according to embodiments may include receiving geometry data, attribute data, and signaling data, decoding the geometry data based on the signaling data, decoding the attribute data based on the signaling data and the decoded geometry data, and rendering the point cloud data reconstructed based on the decoded geometry data and the decoded attribute data.

In an embodiment, the geometry decoding may include splitting reference data for the geometry data into one or more prediction units based on the signaling data, and inter prediction decoding the geometry data by selectively applying a motion vector for each of the split prediction units based on the signaling data.

In an embodiment, the signaling data may include information for identifying whether the motion vector is applied for each prediction unit.

In an embodiment, the motion vector is a global motion vector obtained by estimating motion between consecutive frames at a transmitting side.

In an embodiment, the point cloud data is captured by a LiDAR including one or more lasers at the transmitting side.

In an embodiment, the splitting may include splitting the reference data into one or more prediction units based on elevation or vertical.

In an embodiment, the signaling data may further include information for identifying a magnitude of the elevation corresponding to a reference for splitting the prediction units.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 7 illustrates an example of a neighbor node pattern according to embodiments.

FIG. 19 is a diagram illustrating an example of PU splitting according to embodiments;

FIG. 26 illustrates an example of a bitstream structure of point cloud data for transmission/reception according to embodiments;

FIG. 27 shows a syntax structure of a sequence parameter set according to an embodiment of the present disclosure;

FIG. 28 shows a syntax structure of a geometry parameter set according to an embodiment of the present disclosure;

FIG. 29 shows a syntax structure of a geometry parameter set according to another embodiment of the present disclosure;

FIG. 30 shows a syntax structure of a tile parameter set according to an embodiment of the present disclosure;

FIG. 31 shows a syntax structure of a tile parameter set according to another embodiment of the present disclosure;

FIG. 32 shows a syntax structure of a geometry slice bitstream( ) according to an embodiment of the present disclosure;

FIG. 33 shows an embodiment of a syntax structure of a geometry slice header according to an embodiment of the present disclosure;

FIG. 34 shows a syntax structure of a geometry slice header according to another embodiment of the present disclosure FIG. 35 shows a syntax structure of a geometry PU header according to another embodiment of the present disclosure the present specification;

FIG. 36 shows a syntax structure of an attribute slice bitstream( ) according to an embodiment of the present disclosure; and FIG. 37 shows a syntax structure of an attribute slice header according to an embodiment of the present disclosure.

DETAILED DESCRIPTION

Figure 1:
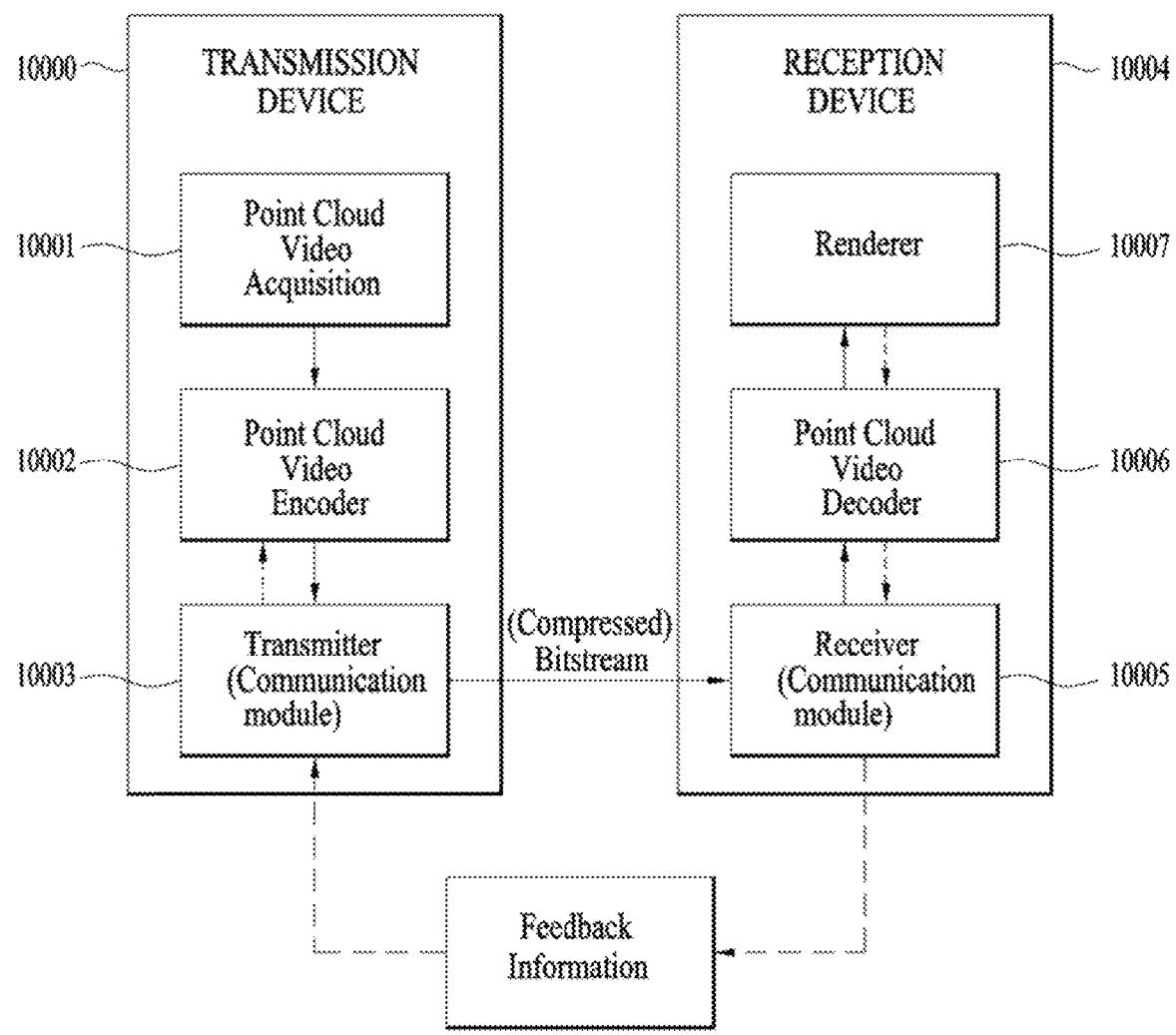
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
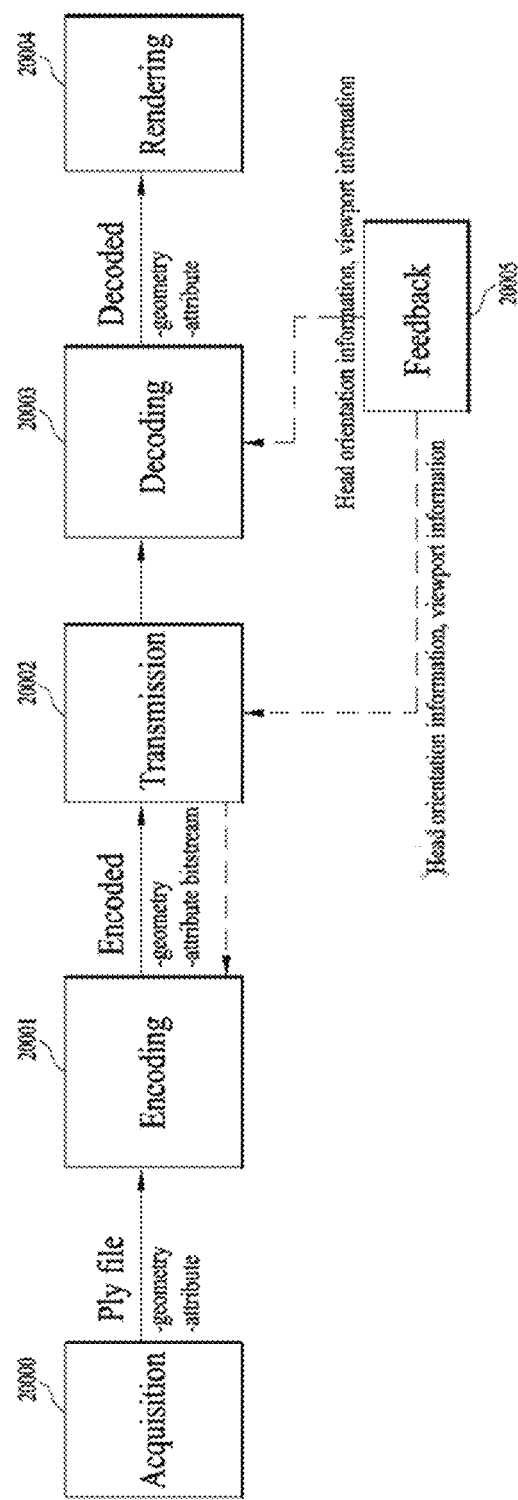
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance.

According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
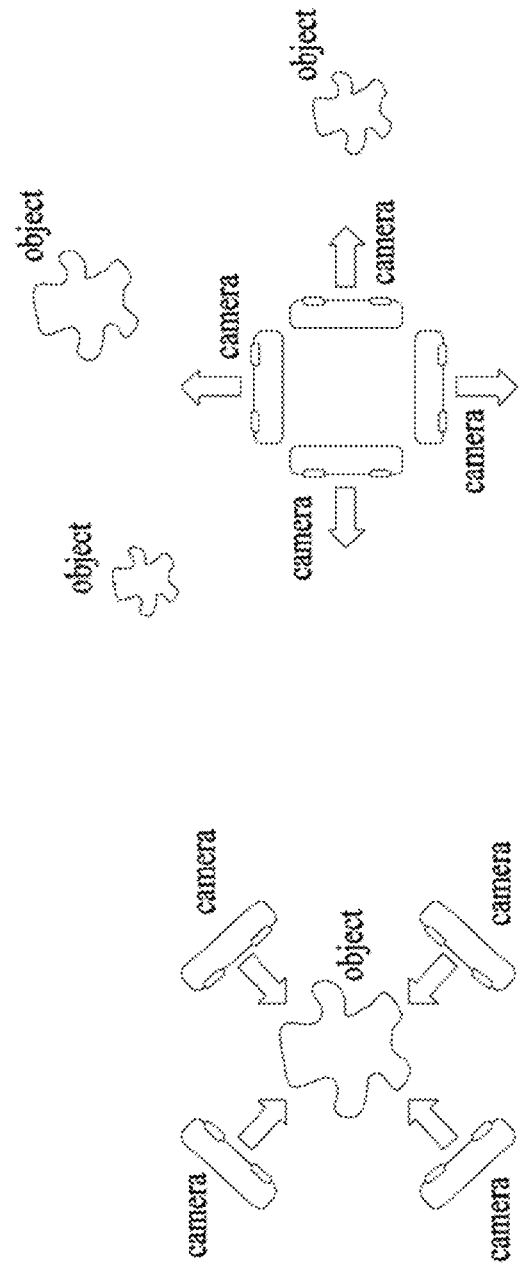
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
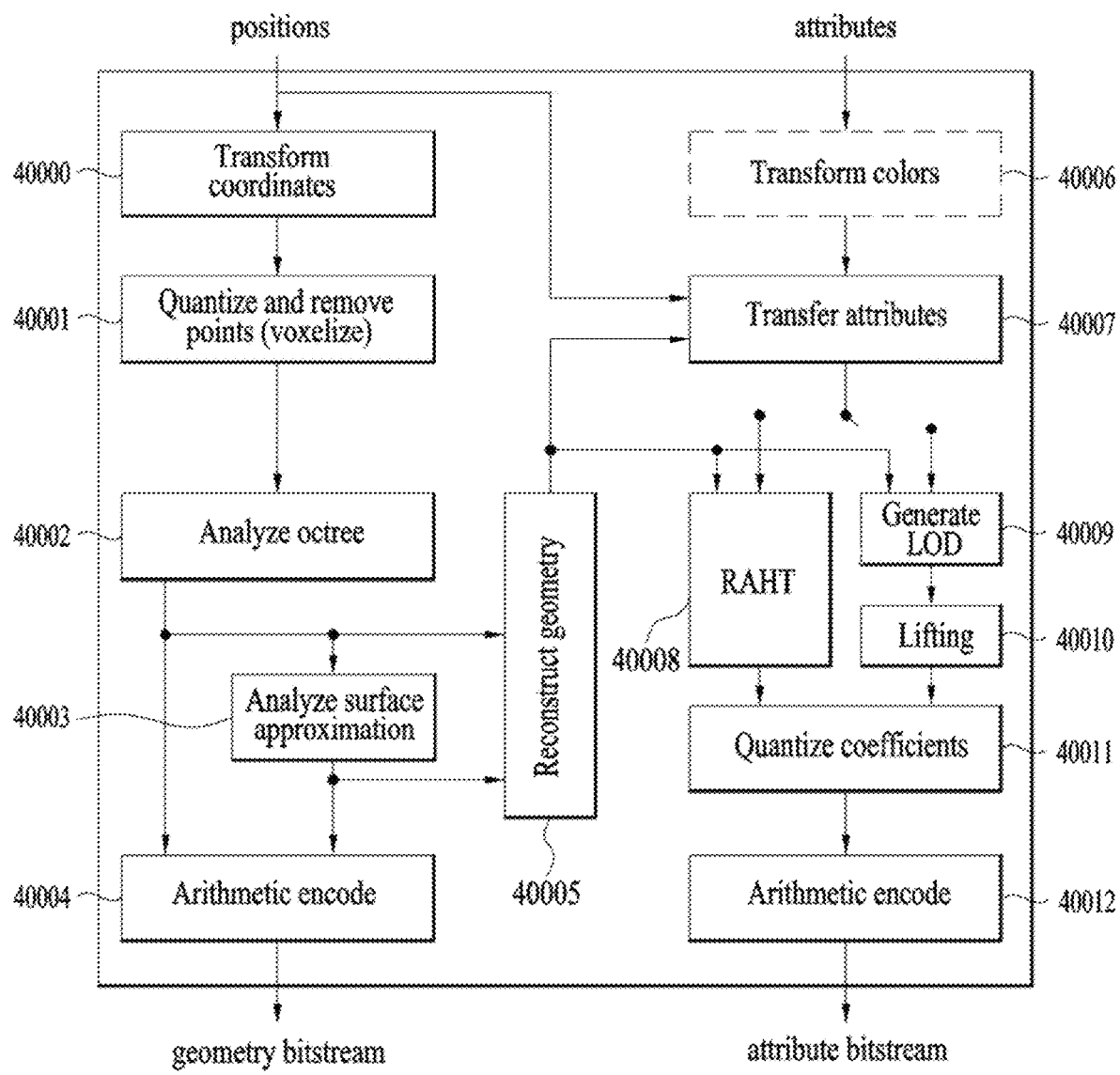
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
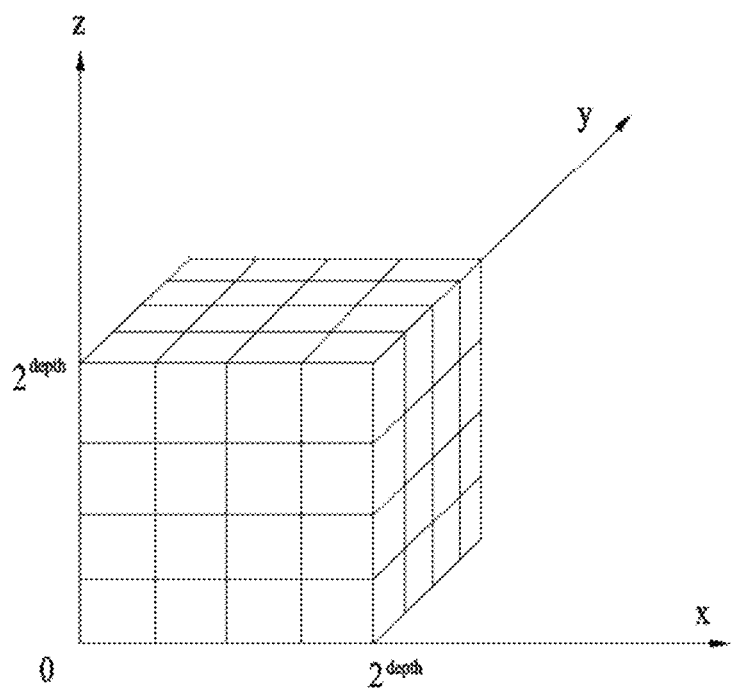
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$ $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
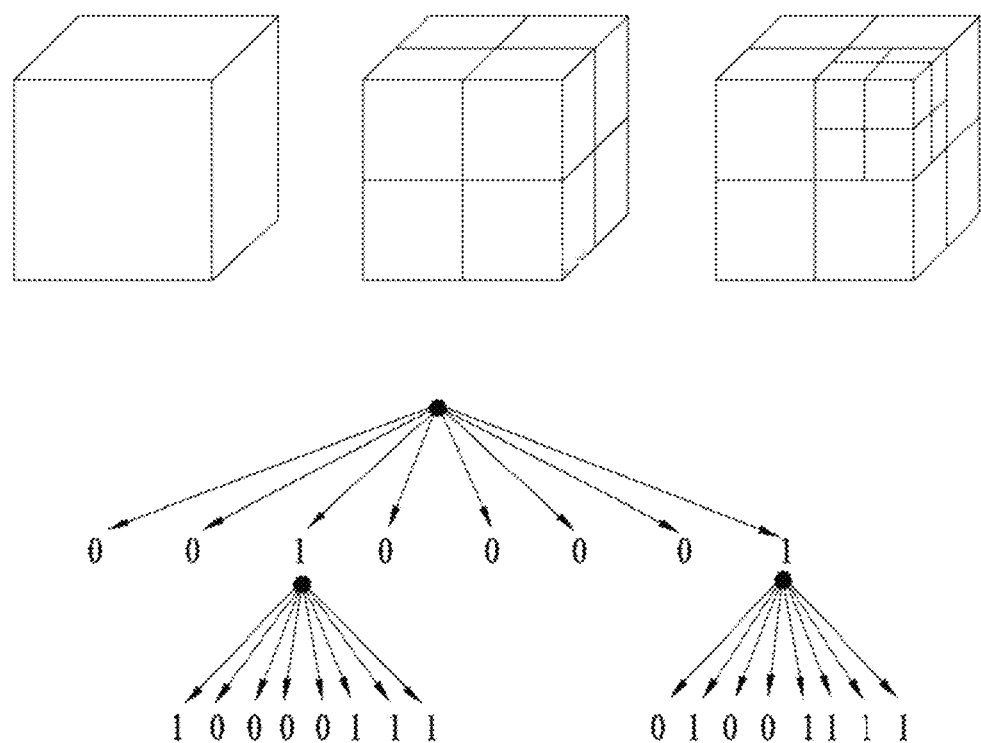
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$ $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d=\text{Ceil}(\text{Log 2}(\text{Max}(x_n^{int}, y_n^{int}, z_n^{int}, n=1, \ldots, N)+1))\quad\text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$①\begin{bmatrix}\mu_x \\ \mu_y \\ \mu_z\end{bmatrix} = \frac{1}{n}\sum_{i=1}^{n}\begin{bmatrix}x_i \\ y_i \\ z_i\end{bmatrix} \quad ②\begin{bmatrix}\bar{x}_i \\ \bar{y}_i \\ \bar{z}_i\end{bmatrix} = \begin{bmatrix}x_i \\ y_i \\ z_i\end{bmatrix} - \begin{bmatrix}\mu_x \\ \mu_y \\ \mu_z\end{bmatrix} \quad ③\begin{bmatrix}\sigma_x^2 \\ \sigma_y^2 \\ \sigma_z^2\end{bmatrix} = \sum_{i=1}^{n}\begin{bmatrix}\bar{x}_i^2 \\ \bar{y}_i^2 \\ \bar{z}_i^2\end{bmatrix}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . , n

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
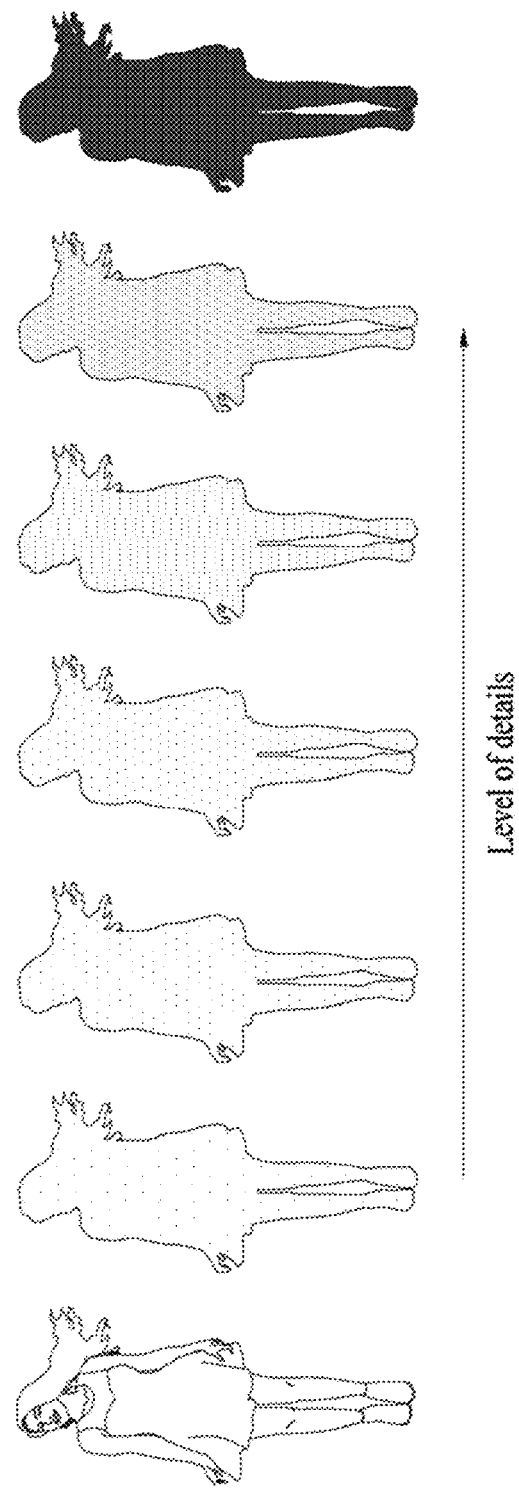
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
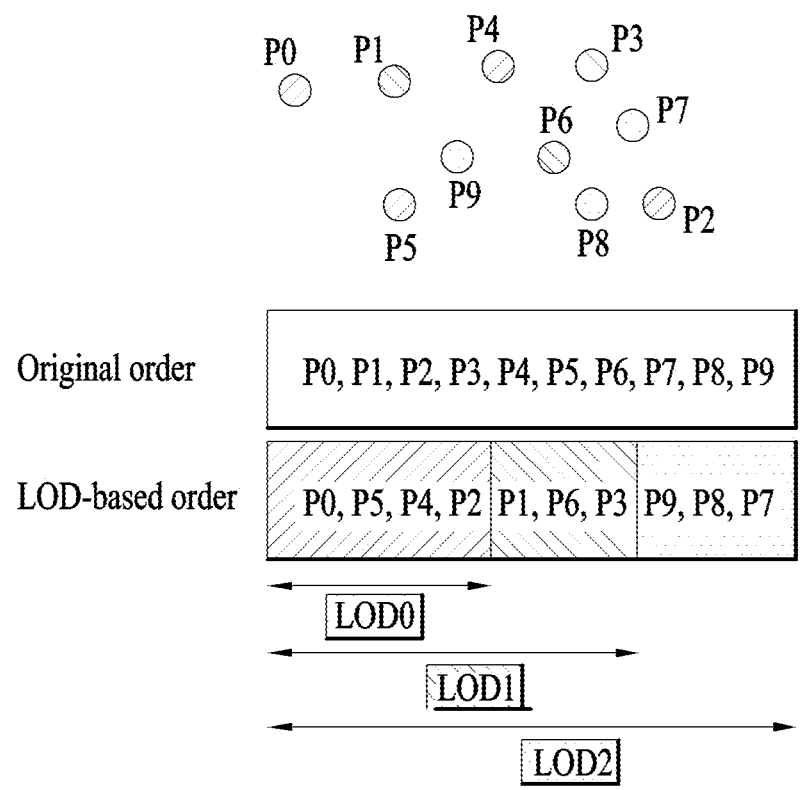
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Equation 3

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as Equation 4.

$$\begin{bmatrix} gDc \\ h_{0_{0,0,0}} \end{bmatrix} = T_{w1000w1001} \begin{bmatrix} g_{1_{0,0,0z}} \\ g_{1_{0,0,1}} \end{bmatrix}$$

Equation 4

The value of gDC is also quantized and subjected to entropy coding like the high-pass coefficients.

Figure 10:
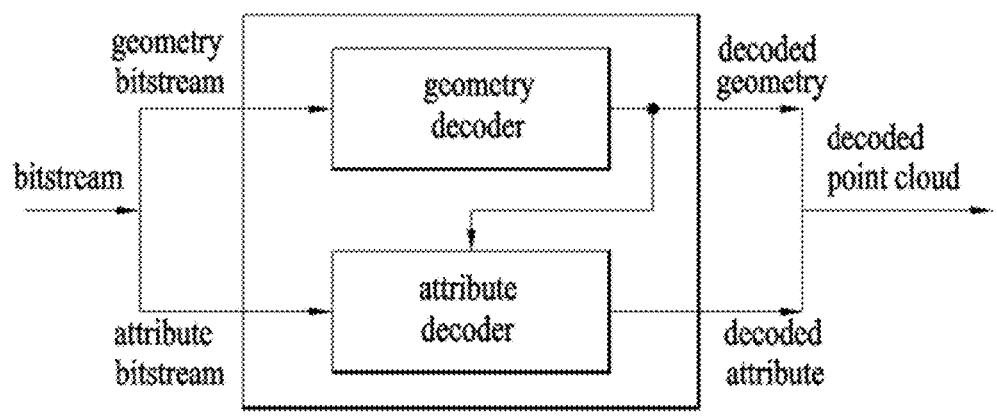
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
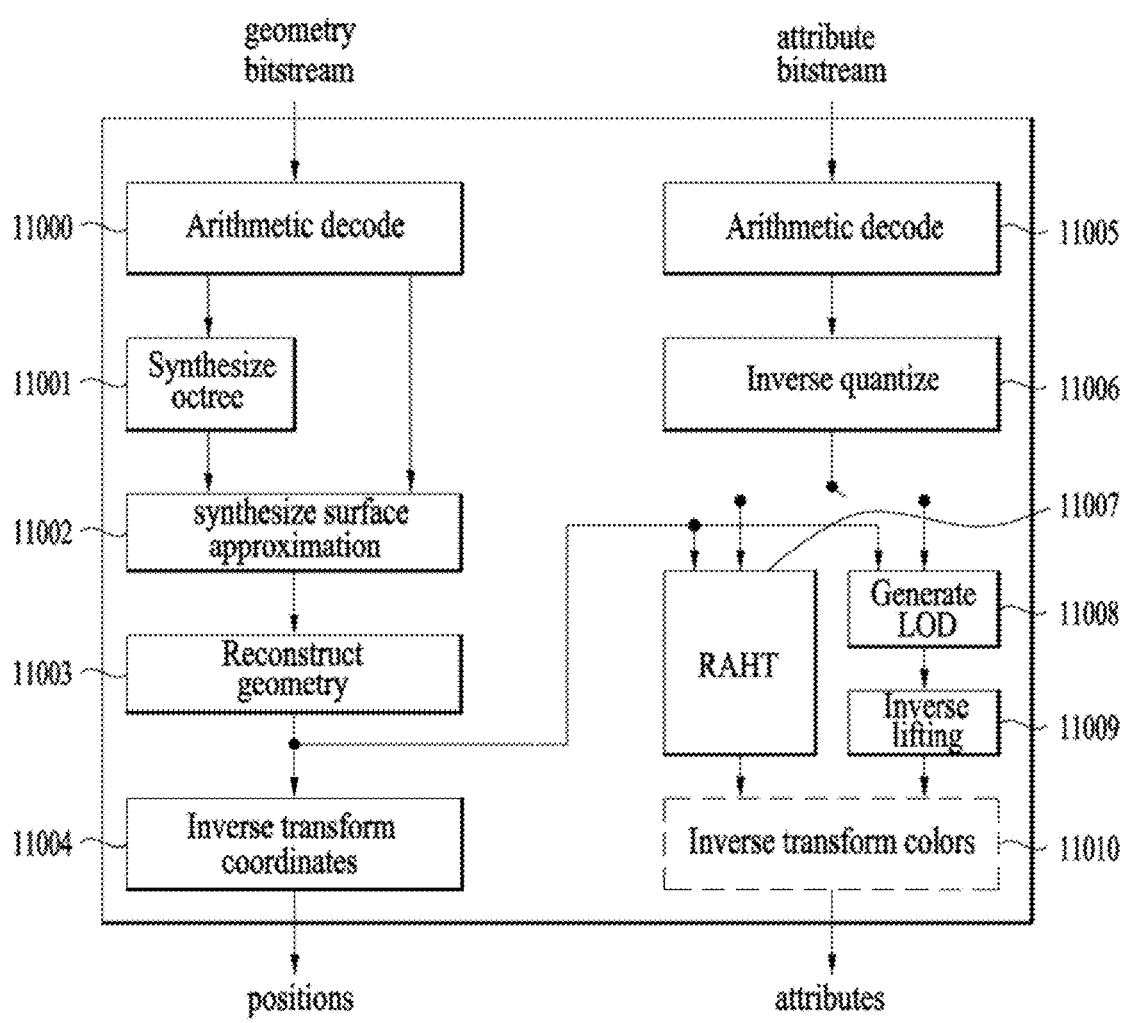
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
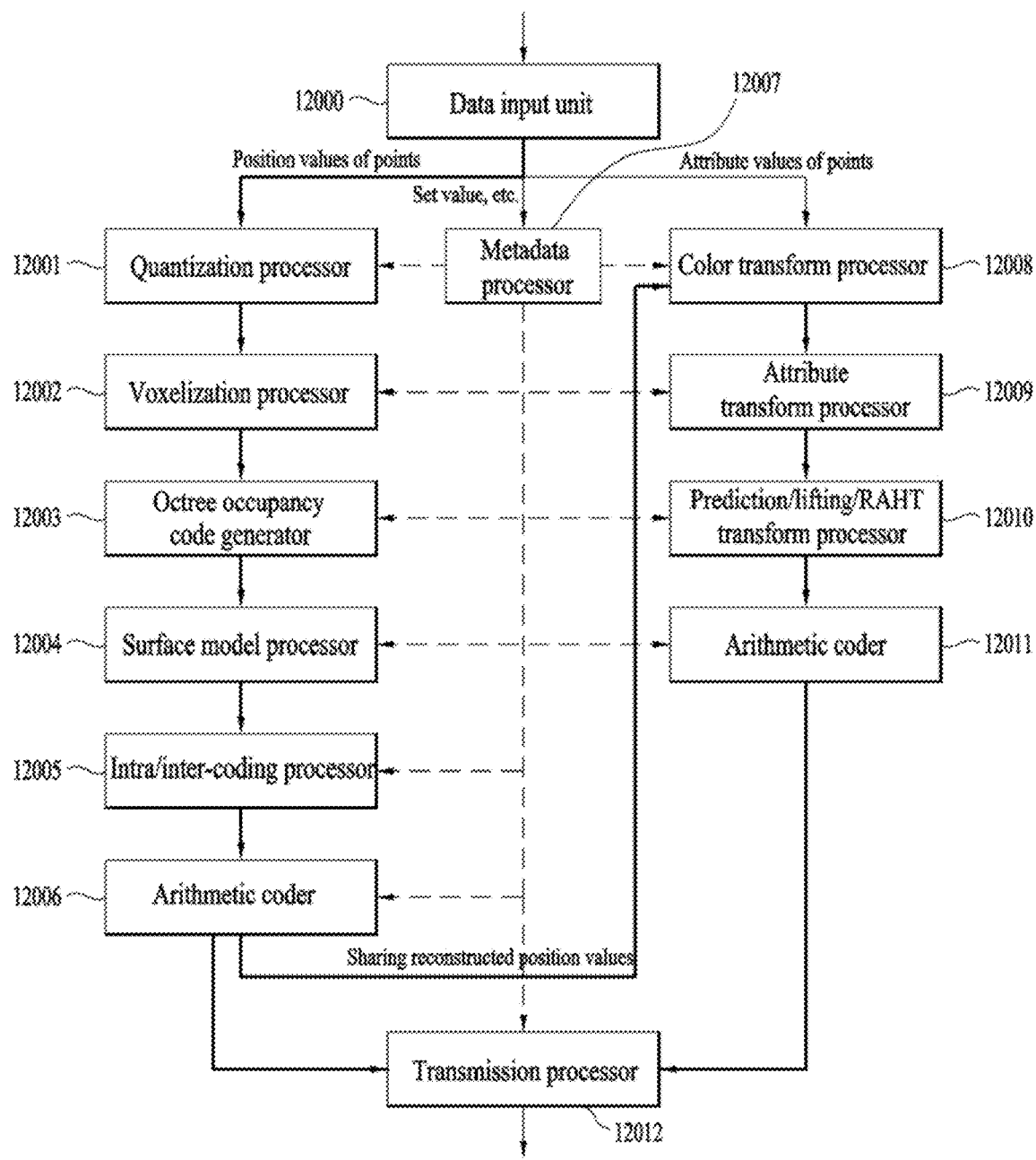
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

The slice is a series of a syntax element representing in whole or in part of the coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
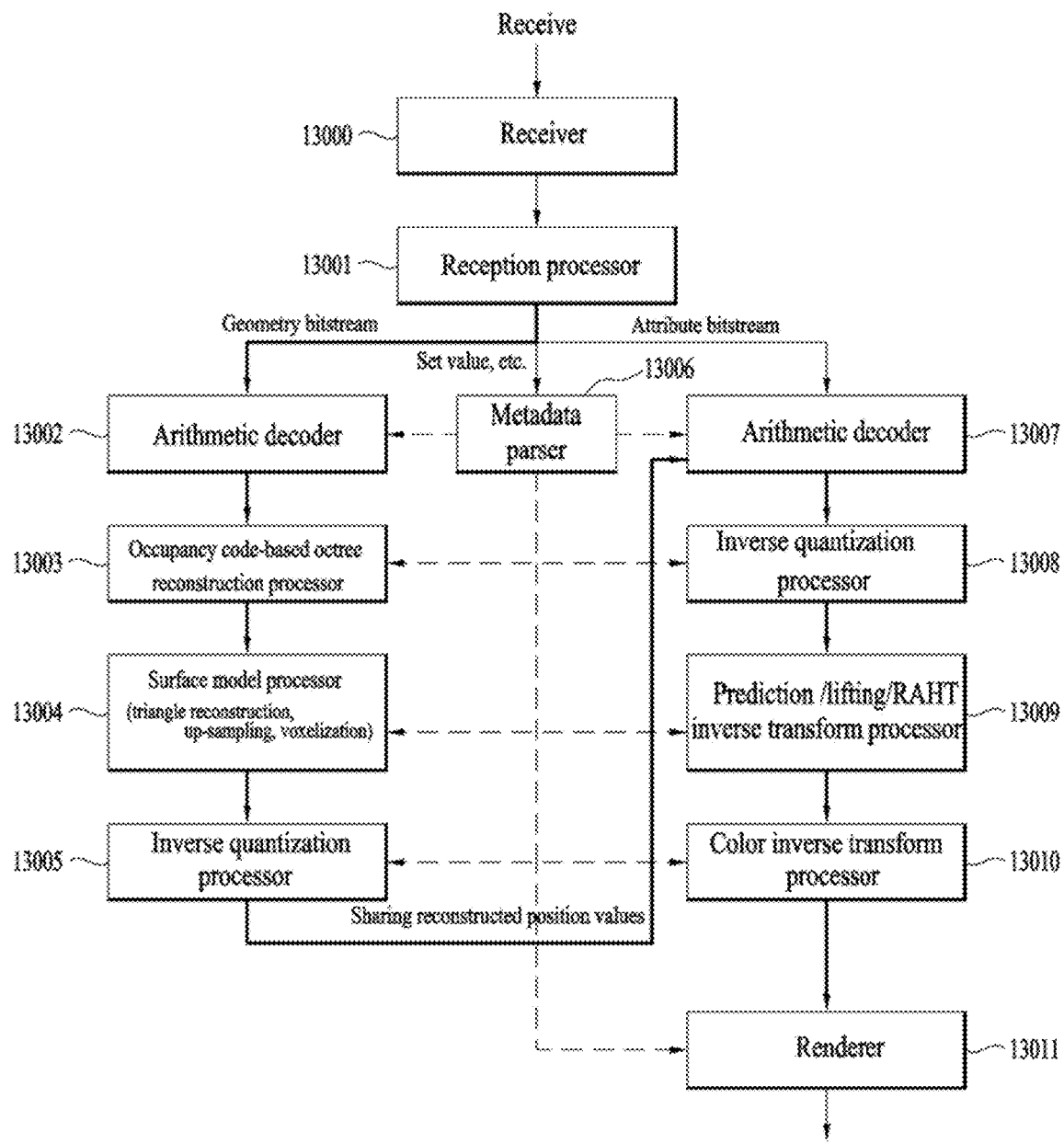
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
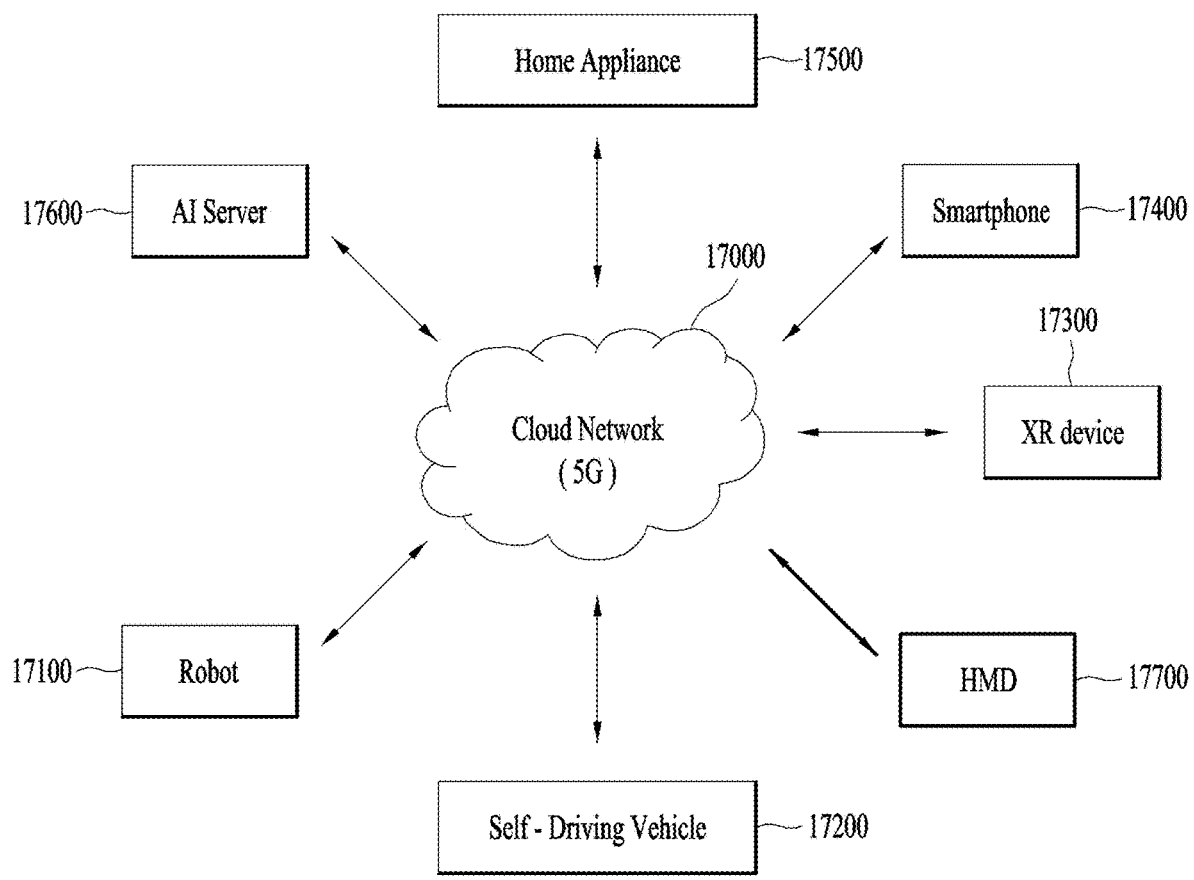
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17100. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described above, the point cloud content providing system may use one or more cameras (e.g., an infrared camera capable of securing depth information, an RGB camera capable of extracting color information corresponding to the depth information, etc.), a projector (e.g., an infrared pattern projector configured to secure depth information, etc.), LiDAR, and the like to generate point cloud content (or point cloud data).

LiDAR refers to equipment configured to measure the distance by measuring the time it takes for the irradiated light to reflect off a subject and return. It provides precise three-dimensional information about the real world as point cloud data over a wide area and long distance. Such large-volume point cloud data may be widely used in various fields where computer vision technology is employed, such as autonomous vehicles, robots, and 3D map production. That is, the LiDAR equipment uses a radar system configured to measure the coordinates of a position of a reflector by emitting a laser pulse and measuring the time it takes for the laser pulse to reflect on a subject (i.e., a reflector) in order to generate point cloud content. According to embodiments, the depth information may be extracted through the LiDAR equipment. The point cloud content generated through the LiDAR equipment may be composed of multiple frames, and the multiple frames may be integrated into one piece of content.

Figure 15A:
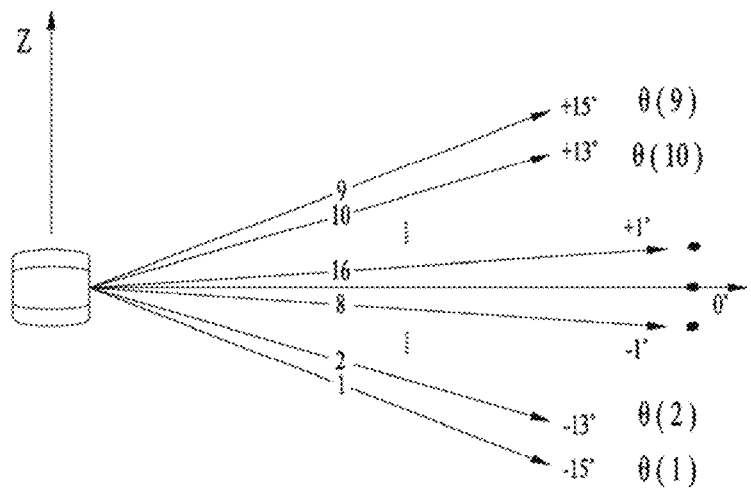
FIGS. 15A and 15B are diagrams illustrating examples of spinning LiDAR learning models according to embodiments.

These LiDAR may consist of N lasers (N=16, 32, 64, etc.) at different elevations $\theta(i)$ i=1, . . . , N. The lasers may capture point cloud data while spinning along the azimuth P with respect to the Z-axis as shown in FIG. 15A and/or 15B. This type is called a spinning LiDAR model. The point cloud content captured by the spinning LiDAR model has angular characteristics.

Figure 15B:
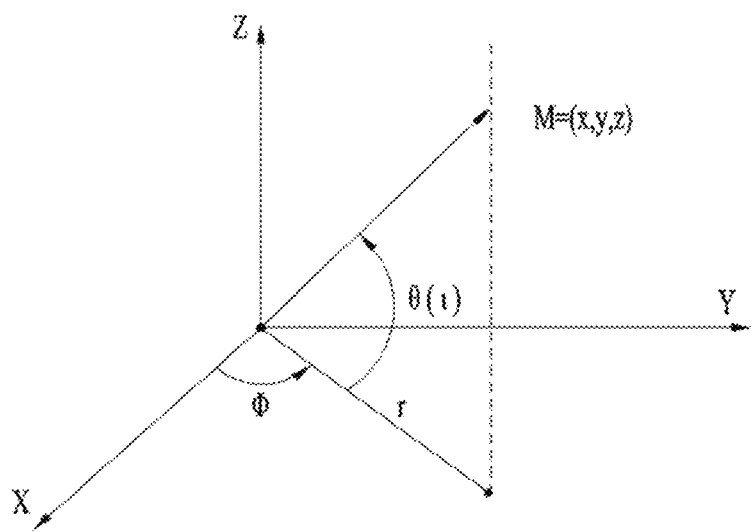

FIGS. 15A and 15B are diagrams illustrating examples of spinning LiDAR learning models according to embodiments.

Referring to FIGS. 15A and 15B, laser i may hit an object M, and the position of M may be estimated as (x, y, z) in the Cartesian coordinate system. In this case, when the position of the object M is represented as (r, φ, i) not (x, y, z) in the Cartesian coordinate system due to the fixed positions of the laser sensors, the straight forward characteristic, and the rotation of the sensors at a certain azimuth angle, and the like, a rule among points may be derived favorably for compression.

Therefore, for the data captured by the spinning LiDAR equipment, when an angular mode is applied in the geometry encoding/decoding process by utilizing such characteristics, compression efficiency may be increased. The angular mode is a method of compressing data with (r, φ, i) rather than (x, y, z). Here, r denotes the radius, p denotes the azimuth or azimuthal angle, and i denotes the i-th laser (e.g., laser index) of the LiDAR. In other words, the frames of the point cloud content generated through the LiDAR equipment may be configured as individual frames rather than being combined together, and the origin thereof may be 0, 0, 0. Accordingly, by changing the frames to a spherical coordinate system, the angular mode may be used.

According to embodiments, when a point cloud is captured by LiDAR equipment in a moving/or stationary vehicle, the angular mode (r, φ, i) may be used. In this case, as the radius r increases with respect to the same azimuth φ, the arc may be elongated. For example, when radius r1<r2 with respect to the same azimuth angle φ as shown in FIG. 16A, arc2<arc2 may be established.

Figure 16A:
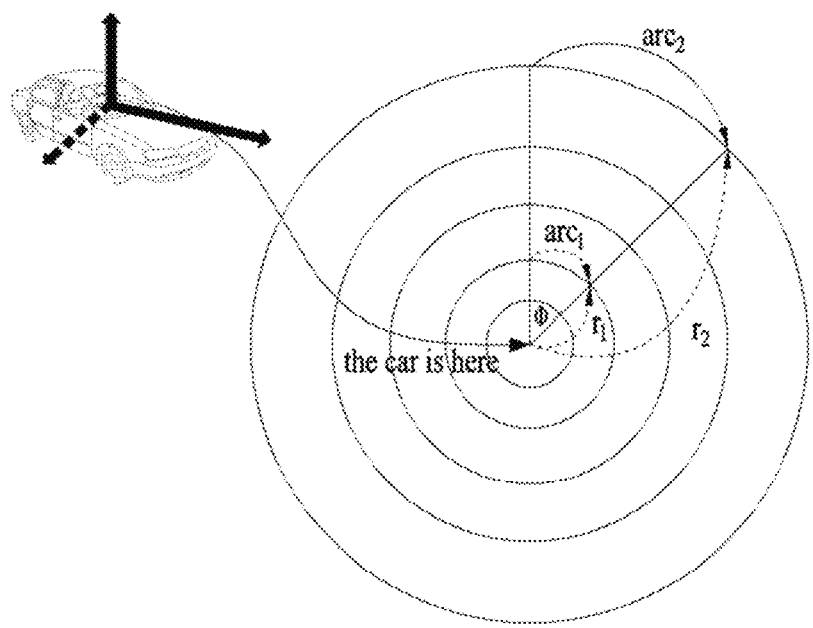
FIGS. 16A and 16B are diagrams illustrating an example of comparing the lengths of arcs according to the same azimuth angle with respect to the center of a vehicle according to embodiments.
Figure 16B:
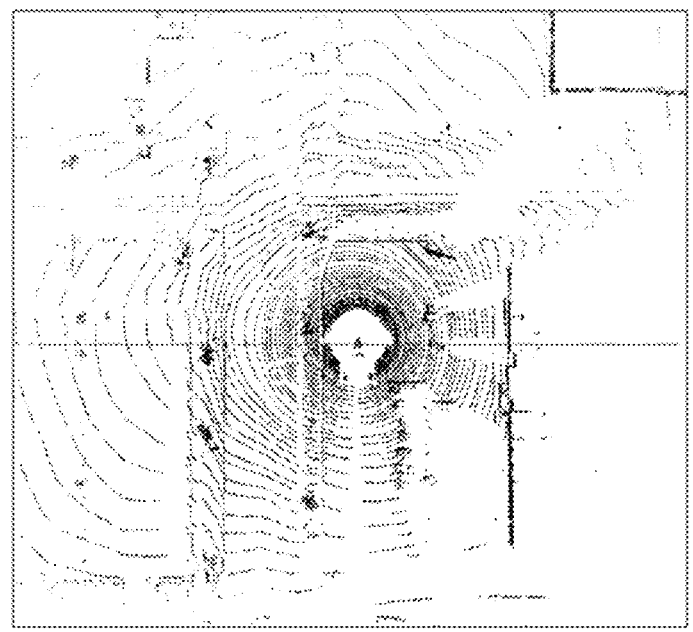

FIGS. 16A and 16B are diagrams illustrating an example of comparing the lengths of arcs according to the same azimuth angle with respect to the center of a vehicle according to embodiments.

In other words, when the angular mode is used, the point cloud content acquired by LiDAR may move within the same azimuth even if it moves a lot as it moves further away from the capture device. In this sense, so the motion of an object in a nearby area may be better captured. In other words, an object in a close area (i.e., an object in an area close to the center) may have a large azimuth even for a small movement, and accordingly the motion of the object may be better captured. In contrast, an object in an area far from the center of appears to move a little even when it actually moves a lot because the arc is large.

In brief, objects moving within the same azimuth have the same rate of change of the arc. Thus, the closer the object is to the center (i.e., the smaller the radius is), the more it appears to move in terms of azimuth, even when it moves slightly. As the distance from the object to the center (i.e. the radius) increases, the object may appear to move a little in terms of azimuth even when it moves a lot.

According to embodiments, this characteristic may vary depending on the precision of the LiDAR. As the precision decreases (i.e., the angle (p by which rotation is performed at once increases), the aforementioned characteristic may be enhanced. That is, a large rotation angle means that the azimuth is large. As the azimuth increases, the motion of an object in a close area may be better captured.

For this reason, a small movement of an object close to the vehicle (i.e., LiDAR equipment) appears to be large and is highly likely to be a local motion vector. When the object is far from the vehicle, the same movement may be unnoticeable, and thus the movement may be more likely to be covered by a global motion vector without any local motion vector. Here, the global motion vector may represent a vector of change in overall motion obtained by comparing consecutive frames, for example, a reference frame (or previous frame) and the current frame, and the local motion vector may represent a vector of change in motion in a specific area.

Therefore, in order to apply the inter prediction-based compression technique through the reference frame to the point cloud data that is captured by LIDAR and has multiple frames, a method of splitting the point cloud data into largest prediction units (LPUs), which are prediction units, and/or prediction units (PUs) by reflecting the characteristics of content may be required.

The present disclosure supports a method of splitting the point cloud data into LPUs and/or PUs by reflecting the characteristics of content in order to perform inter prediction through a reference frame on the point cloud data captured by LIDAR and having multiple frames. Thereby, the present disclosure may widen a predictable region with a local motion vector such that additional calculations are not required, thereby reducing the time required to perform encoding of the point cloud data. In the present disclosure, for simplicity, the LPU may be referred to as a first prediction unit and the PU may be referred to as a second prediction unit.

In addition, in the present disclosure, whether it is a gain to apply a motion vector in a split prediction unit is predicted through rate-distortion optimization (RDO), and the result of prediction is signaled. That is, whether the motion vector is applied in each split prediction unit is signaled. Here, according to an embodiment, the motion vector is a global motion vector. The motion vector may be a local motion vector. Further, the motion vector may be both a global motion vector and a local motion vector.

Regarding inter prediction according to embodiments, definitions of the following terms will be described.
1) I (Intra) Frame; P (Predicted) Frame; B (Bidirectional) Frame.

A frame to be encoded/decoded may be divided into an I frame, a P frame, and a B frame. The frame may be referred to as a picture or the like.

For example, the frames may be transmitted in order of I frame→P frame→(B frame)→(I frame P frame)→ . . . . The B frame may be omitted.
2) Reference Frame A reference frame may be a frame involved in encoding/decoding a current frame.

The immediately preceding I frame or P frame referred to for encoding/decoding of the current P frame may be referred to as a reference frame. A immediately preceding I frame or P frame and an immediately following I frame or P frame referred to for encoding/decoding of the current B frame may be referred to as reference frames.

3) Frame and Intra Prediction Coding/Inter Prediction Coding

Intra-prediction coding may be performed on the I frame, and inter-prediction coding may be performed on the P frame and the B frame.

When the rate of change of a P frame with respect to the previous reference frame is greater than a specific threshold, intra-prediction coding may be performed on the P frame as in the case of the I frame.

4) Criteria for Determining the I (Intra) Frame

Among the multiple frames, every k-th frame may be designated as an I frame. Alternatively, scores related to a correlation between frames may be set and a frame having a high score may be configured as an I frame.

5) Encoding/Decoding of I Frames

In encoding/decoding point cloud data having multiple frames, the geometry of the I frame may be encoded/decoded based on an octree or a predictive tree. Then, the attribute information about the I frame may be encoded/decoded based on the predictive/lifting transform scheme or the RAHT scheme based on the reconstructed geometry information.

6) Encoding/Decoding of P Frames

In encoding/decoding point cloud data having multiple frames, according to embodiments, the P frame may be encoded/decoded based on a reference frame.

In this case, the coding unit for inter prediction of the P frame may be a frame, a tile, a slice, or an LPU or PU. To this end, the present disclosure may split (or divide) the point cloud data or frames or tiles or slices into LPUs and/or PUs. For example, the present disclosure may split the points partitioned into slices into LPUs and/or PUs again.

In addition, point cloud content, a frame, a tile, a slice, and the like that are to be split may be referred to as point cloud data. In other words, points belonging to point cloud content to be split, points belonging to a frame, points belonging to a tile, and points belonging to a slice may be referred to as point cloud data.

According to an embodiment of the present disclosure, partition or segmentation of point cloud data may be performed based on elevation. In an embodiment of the present disclosure, the point cloud data may be split into LPUs and/or PUs based on elevation. In the present disclosure, the elevation may be referred to as vertical. That is, in the present disclosure, elevation and vertical may have the same meaning, and may be used interchangeably. In other words, in the present disclosure, point cloud data may be split into LPUs and/or PUs based on vertical.

In an embodiment of the present disclosure, the point cloud data may be split based on a radius. In an embodiment of the present disclosure, the point cloud data may be split into LPUs and/or PUs based on the radius.

In an embodiment of the present disclosure, the point cloud data may be split based on an azimuth. In an embodiment of the present disclosure, the point cloud data may be split into LPUs and/or PUs based on the azimuth.

In an embodiment of the present disclosure, point cloud data may be split by combining one or more of elevation (or vertical)-based splitting, radius-based splitting, and azimuth-based splitting. According to an embodiment of the present disclosure, the point cloud data may be split into LPUs and/or PUs by combining one or more of elevation (or vertical)-based splitting, radius-based splitting, and azimuth-based splitting.

In an embodiment of the present disclosure, the point cloud data may be split into LPUs by combining one or more of elevation (or vertical)-based splitting, radius-based splitting, and azimuth-based splitting.

In an embodiment of the present disclosure, the point cloud data may be split into PUs by combining one or more of elevation (or vertical)-based splitting, radius-based splitting, and azimuth-based splitting.

In an embodiment of the present disclosure, the point cloud data may be split into LPUs by combining one or more of elevation (or vertical)-based splitting, radius-based splitting, and azimuth-based splitting, and then additionally split into one or more PUs by combining one or more of elevation (or vertical)-based splitting, radius-based splitting, and azimuth-based splitting.

In an embodiment of the present disclosure, a PU may be split into smaller Pus.

According to an embodiment of the present disclosure, whether to apply a motion vector is determined for each split region by combining one or more of elevation (or vertical)-based splitting, radius-based splitting, and azimuth-based splitting. According to an embodiment of the present disclosure, rate distortion optimization (RDO) may be checked for each of the regions split by combining one or more of elevation (or vertical)-based splitting, radius-based splitting, and azimuth-based splitting to determine whether to apply a motion vector for each region. In an embodiment of the present disclosure, whether to apply a motion vector for each region may be signaled. Here, the split region or the split block may be an LPU or a PU. Also, the motion vector may be a global motion vector or a local motion vector. In an embodiment of the present disclosure, the motion vector is the global motion vector.

In an embodiment of the present disclosure, a method used for LPU split and/or PU split is signaled.

According to an embodiment of the present disclosure, determining whether to apply a motion vector for each split region may be determined based on the elevation (or vertical). In an embodiment of the present disclosure, the point cloud data may be split based on elevation (or vertical), and then RDO may be checked for each split region to determine whether to apply a global motion vector for each region. According to an embodiment of the present disclosure, signaling whether to apply the global motion vector for each region may be signaled. Here, the split region or the split block may be an LPU or a PU.

According to embodiments, LPU/PU split and inter prediction-based encoding (i.e., compression) may be performed by the geometry encoder at the transmitting side, and LPU/PU split and inter prediction-based decoding (i.e., reconstruction) may be performed by the geometry decoder at the receiving side.

According to embodiments, whether a motion vector is applied for each split LPU/PU is signaled by the geometry encoder at the transmitting side, and the motion compensation for the LPU/PU may be performed by the geometry decoder at the receiving side based on signaling information including whether the motion vector is applied.

Hereinafter, an LPU splitting method for point cloud data captured with LiDAR will be described.

According to embodiments, a largest prediction unit (LPU) may be the largest unit for splitting point cloud content (or frame) for inter-frame prediction (i.e., inter prediction).

According to embodiments, multiple frames (multi-frames) captured by the LiDAR may have the following characteristics in a change between frames.

That is, the closer a frame is from the center, the higher the probability that a local motion vector will occur. Also, there may be a high probability that new points will be generated in the farthest region among the regions belonging to a specific angle based on the global motion vector.

Figure 17:
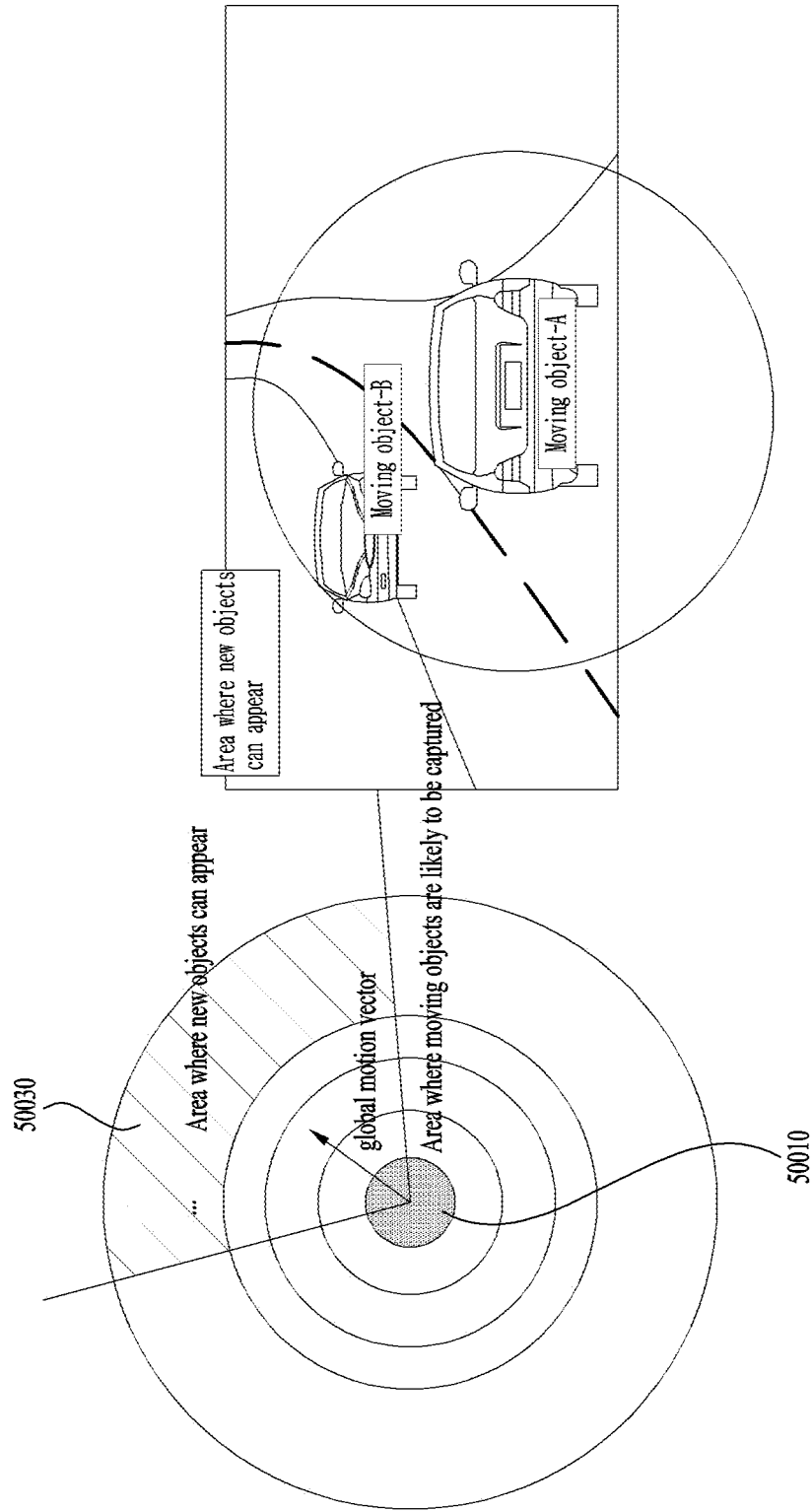
FIG. 17 is a diagram illustrating an example of radius-based LPU splitting and motion possibility according to embodiments.

FIG. 17 is a diagram illustrating an example of radius-based LPU splitting and motion possibility according to embodiments. That is, FIG. 17 illustrates an example of splitting point cloud data captured by LiDAR into five regions (or referred to as blocks) based on a radius.

When the point cloud data is split based on the radius as shown in FIG. 17, there may be regions where a local motion vector is highly likely to occur vector, that is, a region 50010 having a moving object and a region 50030 where a new object may appear, based on the global motion. Accordingly, the region 50030 is likely to have additional points, and the region 50010 may be a region in which a local motion vector should be applied. In the other regions, the position of a point similar to the current frame may be obtained simply by prediction through application of the global motion vector.

Figure 18:
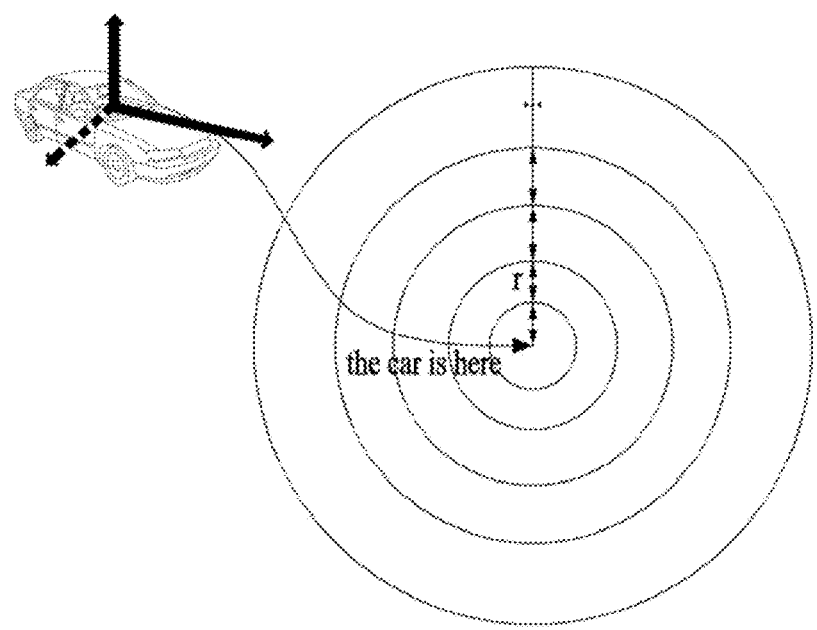
FIG. 18 illustrates a specific example in which LPU splitting of point cloud data is performed based on a radius according to embodiments.

According to embodiments, the LPU split criterion may be designated based on a radius as in FIG. 17 or FIG. 18.

FIG. 18 illustrates a specific example in which LPU splitting of point cloud data is performed based on a radius according to embodiments. That is, FIG. 18 illustrates an example in which the radius used as a reference for LPU splitting is r.

FIG. 18 is merely an embodiment for helping those skilled in the art to understand the present disclosure. Depending on the characteristics of the point cloud data (or point cloud content or frame), LPU splitting of the point cloud data may be performed based on the azimuth or elevation (or vertical).

In the present disclosure, by splitting point cloud data into one or more LPUs by one or a combination of two or more of radius-based splitting, azimuth-based splitting, and elevation-based splitting, a region that may be predicted only with the global motion vector is expanded to eliminate the need for additional calculation. Accordingly, the execution time for encoding of the point cloud data may be reduced, that is, the encoding execution time may be shortened.

Hereinafter, a method for PU splitting of point cloud data captured by LiDAR or point cloud data split into LPUs.

According to embodiments, the point cloud data (or point cloud content or region or block) split into LPUs for inter-frame prediction (i.e., inter prediction) may be split into one or more PUs again.

According to embodiments, when a region is split into smaller PUs again according to the probability of occurrence of a local motion vector in the region, the processor for sub-splitting and motion vector search according to the sub-splitting may be reduced, and according there is no need for additional calculations. Therefore, the encoding execution time may be reduced.

The present disclosure may apply the following characteristics of the point cloud data (or point cloud content) to the PU splitting method.

1) As the elevation increases, the probability that a local motion vector will occur may decrease. This is because as the elevation increases, the probability that the data is a motionless sky or building increases. In other words, there is a high probability that there is no local motion.

2) When the elevation is very low, the probability of occurrence of a local motion vector may be low. This is because the probability that the data is a road increases as the elevation is lowered.

3) There may be a probability that an object exists within a specific azimuth in the split LPU or PU. In this case, the azimuth for PU splitting (e.g., the azimuth that serves as a reference during PU splitting) may be set through experimentation. Also, there may be an azimuth that may include a moving person with a difference of one frame, and an azimuth that may include a moving car may be constant. According to embodiments, when a typical azimuth is found through an experiment, there is a high probability that regions in which a local motion vector is to be applied may be separated.

4) There may be a probability that an object exists within a specific radius within the split LPU or PU. In this case, the radius for PU splitting (e.g., the radius used as a reference for PU splitting) may be set through an experiment. Also, there may be a radius that may include a moving person with a difference of one frame, and a radius that may include a moving vehicle may be constant. According to embodiments, once a typical radius is found through an experiment, there is a high probability that regions in which a local motion vector is to be applied may be separated.

Therefore, in this embodiment, when the point cloud data is split into LPUs, and then the LPU is split into one or more PUs again, the block (or region) split into LPUs may be additionally split based on the motion block elevation (motion_block_pu_elevation) e. When no local motion vector can be matched to the additionally split block (or region), additional splitting may be performed again. In this case, the block may be additionally split based on (or by applying) the motion block azimuth (motion_block_pu_azimuth) φ. However, when the local motion vector cannot be matched to the block (or region) additionally split based on the motion block azimuth φ, additional splitting may be performed again based on the motion block radius (motion_block_pu_radius) r. Alternatively, the block may be additionally split to have half the size of the PU block (or region).

FIG. 19 is a diagram illustrating an example of PU splitting according to embodiments. In this case, PU splitting may be performed based on one or a combination of two or more of motion block elevation (motion_block_pu_elevation) e, motion block azimuth (motion_block_pu_azimuth) y, and motion block radius (motion_block_pu_radius) r. Here, the motion block elevation (motion_block_pu_elevation) e represents the reference elevation (or vertical) for PU splitting, the motion block azimuth (motion_block_pu_azimuth) φ represents the reference azimuth for PU splitting, and the motion block radius (motion_block_pu_radius) r represents the reference radius for PU splitting. In this case, PU splitting may be applied to a frame, a tile, or a slice.

According to embodiments, when PU splitting is performed by combining two or more of the motion block elevation (motion_block_pu_elevation) e, the motion block azimuth (motion_block_pu_azimuth) y, and the motion block radius (motion_block_pu_radius) r, it may be performed in various orders. For example, PU splitting may be performed in the following order: elevation→azimuth→radius, elevation→radius→azimuth, azimuth→elevation→radius, azimuth→radius→elevation, radius→elevation→azimuth or radius→azimuth→elevation, elevation→azimuth, elevation→radius, azimuth→elevation, azimuth→radius, radius→elevation, and radius→azimuth.

Thus, the present embodiments may reduce the encoding execution time by not requiring additional calculations by expanding a region predictable with a local motion vector.

Hereinafter, a method for supporting LPU/PU splitting based on octree-based content characteristics.

In the present disclosure, when it is desired to match the LPU splitting and PU splitting to an octree occupancy bit in octree-based geometry encoding, an appropriate size may be set by performing the following process.

That is, the size of the octree node that may be covered by the center reference motion block radius (motion_block_pu_radius) r may be set as the motion block size (motion_block size). And, based on the set size, LPU splitting may not be performed up to a specific octree level.

After splitting into LPUs, the order of axes may be determined for PU splitting. For example, the order of axes may be specified and applied as xyz, xzy, yzx, yxz, zxy, or zyx.

The present embodiments may support a method of applying the LPU/PU splitting method together according to the characteristics of the octree structure and content. The basic goal of LPU/PU splitting is to widen a region predictable with a possible local motion vector to eliminate the need for additional calculations and reduce the encoding execution time.

Figure 20:
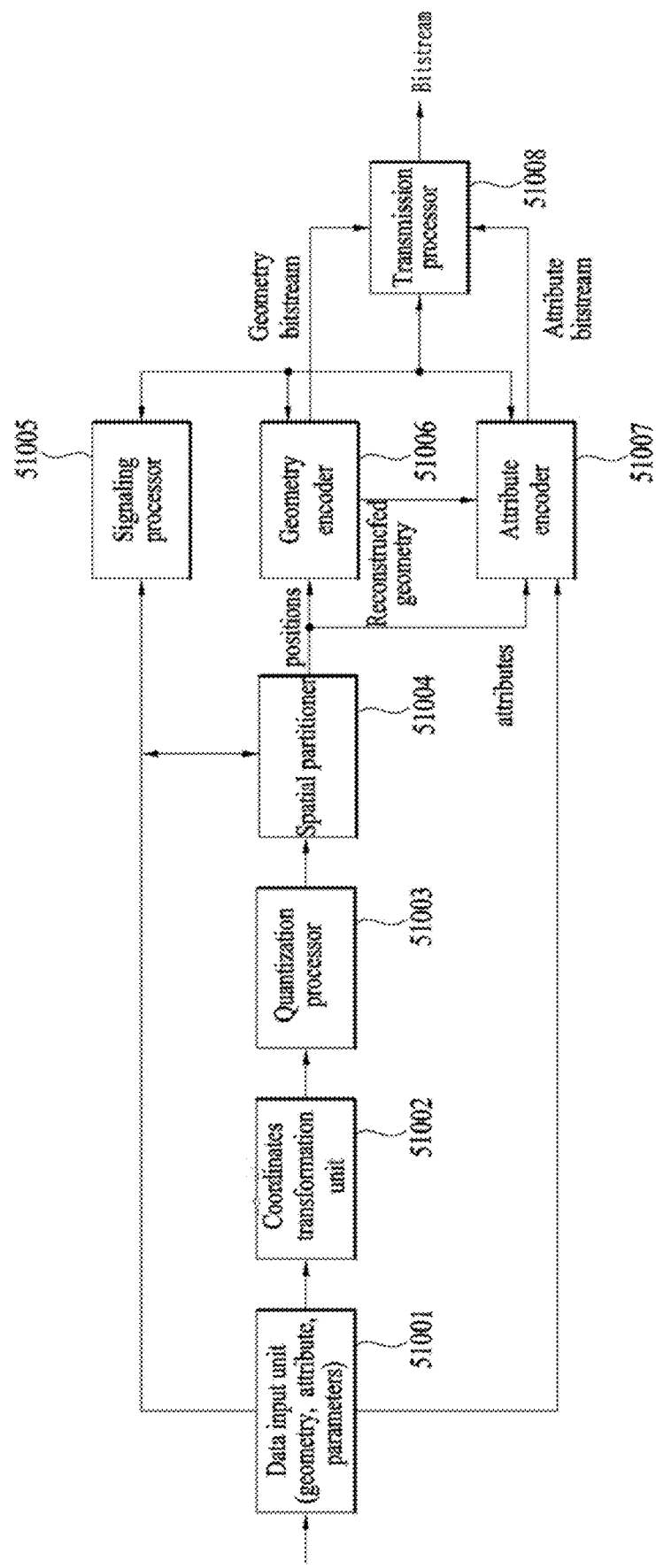
FIG. 20 is a diagram illustrating another example of a point cloud transmission device according to embodiments.

FIG. 20 is a diagram illustrating another example of a point cloud transmission device according to embodiments.

The point cloud transmission device according to the embodiments may include a data input unit 51001, a coordinates transformation unit 51002, a quantization processor 51003, a spatial partitioner 51004, a signaling processor 51005, a geometry encoder 51006, an attribute encoder 51007, and a transmission processor 51008. According to embodiments, the coordinates transformation unit 51002, the quantization processor 51003, the spatial partitioner 51004, the geometry encoder 51006, and the attribute encoder 51007 may be referred to as point cloud video encoders.

The point cloud data transmission device of FIG. 20 may correspond to the transmission device 10000 of FIG. 1, the point cloud video encoder 10002 of FIG. 1, the transmitter 10003 of FIG. 1, the acquisition 20000/encoding 20001/transmission 20002 of FIG. 2, the point cloud video encoder of FIG. 4, the transmission device of FIG. 12, the device of FIG. 14, and the like. Each component in FIG. 20 and the corresponding figures may correspond to software, hardware, a processor connected to a memory, and/or a combination thereof.

The data input unit 51001 may perform some or all of the operations of the point cloud video acquisition unit 10001 of FIG. 1, or may perform some or all of the operations of the data input unit 12000 of FIG. 12. The coordinates transformation unit 51002 may perform some or all of the operations of the coordinates transformation unit 40000 of FIG. 4. Further, the quantization processor 51003 may perform some or all of the operations of the quantization unit 40001 of FIG. 4, or may perform some or all of the operations of the quantization processor 12001 of FIG. 12. That is, the data input unit 51001 may receive data to encode the point cloud data. The data may include geometry data (which may be referred to as geometry, geometry information, etc.), attribute data (which may be referred to as an attribute, attribute information, etc.), and parameter information indicating coding-related settings.

The coordinates transformation unit 51002 may support coordinate transformation of point cloud data, such as changing the xyz axes or transforming the data from the xyz Cartesian coordinate system to a spherical coordinate system.

The quantization processor 51003 may quantize the point cloud data. For example, it may adjust the scale by multiplying the x, y, and z values of the position of the point cloud data by the scale according to the scale (scale=geometry quantization value) setting. The scale value may follow the set value or be included in the bitstream as parameter information and delivered to the receiver.

The spatial partitioner 51004 may spatially partition the point cloud data quantized and output by the quantization processor 51003 into one or more 3D blocks based on a bounding box and/or a sub-bounding box. For example, the spatial partitioner 51004 may partition the quantized point cloud data into tiles or slices for region-by-region access or parallel processing of content. In one embodiment, the signaling information for spatial partition is entropy-encoded by the signaling processor 51005 and then transmitted through the transmission processor 51008 in the form of a bitstream.

In one embodiment, the point cloud content may be one person such as an actor, multiple people, one object, or multiple objects. In a larger range, it may be a map for autonomous driving or a map for indoor navigation of a robot. In this case, the point cloud content may be a vast amount of locally connected data. In this case, the point cloud content cannot be encoded/decoded at once, and accordingly tile partitioning may be performed before the point cloud content is compressed. For example, room #101 in a building may be partitioned into one tile and room #102 in the building may be partitioned into another tile. In order to support fast encoding/decoding by applying parallelization to the partitioned tiles, the tiles may be partitioned (or split) into slices again. This operation may be referred to as slice partitioning (or splitting).

That is, a tile may represent a partial region (e.g., a rectangular cube) of a 3D space occupied by point cloud data according to embodiments. According to embodiments, a tile may include one or more slices. The tile according to the embodiments may be partitioned into one or more slices, and thus the point cloud video encoder may encode point cloud data in parallel.

A slice may represent a unit of data (or bitstream) that may be independently encoded by the point cloud video encoder according to the embodiments and/or a unit of data (or bitstream) that may be independently decoded by the point cloud video decoder. A slice may be a set of data in a 3D space occupied by point cloud data, or a set of some data among the point cloud data. A slice according to the embodiments may represent a region or set of points included in a tile according to embodiments. According to embodiments, a tile may be partitioned into one or more slices based on the number of points included in one tile. For example, one tile may be a set of points partitioned by the number of points. According to embodiments, a tile may be partitioned into one or more slices based on the number of points, and some data may be split or merged in the partitioning process. That is, a slice may be a unit that may be independently coded within a corresponding tile. In this way, a tile obtained by spatially partitioning may be partitioned into one or more slices for fast and efficient processing.

The point cloud video encoder according to the embodiments may encode point cloud data on a slice-by-slice basis or a tile-by-tile basis, wherein a tile includes one or more slices. In addition, the point cloud video encoder according to the embodiments may perform different quantization and/or transformation for each tile or each slice.

Positions of one or more 3D blocks (e.g., slices) spatially partitioned by the spatial partitioner 51004 are output to the geometry encoder 51006, and the attribute information (or attributes) is output to the attribute encoder 51007. The positions may be position information about the points included in a partitioned unit (box, block, tile, tile group, or slice), and are referred to as geometry information.

The geometry encoder 51006 outputs a geometry bitstream by performing inter-prediction or intra-prediction-based encoding on positions output from the spatial partitioner 51004. In this case, the geometry encoder 51006 may split a frame, a tile or a slice into LPUs and/or PUs by applying the LPU/PU splitting method described above for inter-prediction-based encoding of a P frame, and may or may not apply a motion vector for each split region (i.e., LPU or PU) for motion compensation. In addition, whether a motion vector is applied for each split region may be signaled. Here, the motion vector may be a global motion vector or a local motion vector. Also, the geometry encoder 51006 may reconstruct the encoded geometry information and output the reconstructed information to the attribute encoder 51007.

The attribute encoder 51007 encodes (i.e., compresses) the attributes output from the spatial partitioner 51004 (e.g., split attribute sourced data) based on the reconstructed geometry output from the geometry encoder 51006 and outputs an attribute bitstream.

Figure 21:
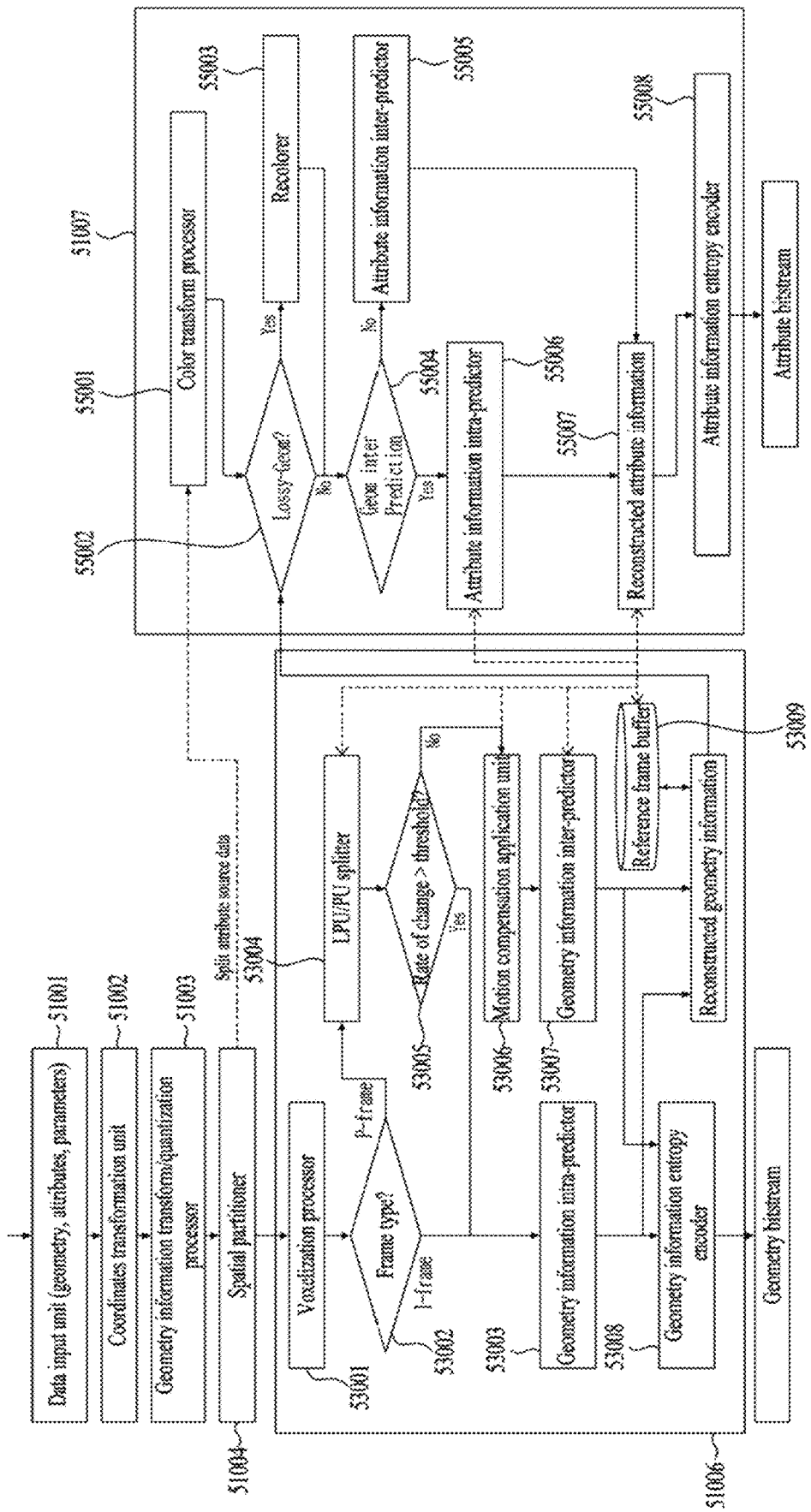
FIG. 21 is a diagram illustrating an example of operations of a geometry encoder and an attribute encoder according to embodiments.

FIG. 21 is a diagram illustrating an example of operations of the geometry encoder 51006 and the attribute encoder 51007 according to embodiments.

In an embodiment, a quantization processor may be further provided between the spatial partitioner 51004 and the voxelization processor 53001. The quantization processor quantizes positions of one or more 3D blocks (e.g., slices) spatially partitioned by the spatial partitioner 51004. In this case, the quantization processor may perform some or all of the operations of the quantization unit 40001 of FIG. 4, or perform some or all of the operations of the quantization processor 12001 of FIG. 12. When the quantization processor is further provided between the spatial partitioner 51004 and the voxelization processor 53001, the quantization processor 51003 of FIG. 20 may or may not be omitted.

The voxelization processor 53001 according to the embodiments performs voxelization based on the positions of the one or more spatially partitioned 3D blocks (e.g., slices) or the quantized positions thereof. Voxelization refers to the minimum unit expressing position information in a 3D space. That is, the voxelization processor 53001 may support the process of rounding the geometric position values of the scaled points to integers. Points of point cloud content (or 3D point cloud video) according to embodiments may be included in one or more voxels. According to embodiments, one voxel may include one or more points. In an embodiment, in the case where quantization is performed before voxelization is performed, a plurality of points may belong to one voxel.

In the present disclosure, when two or more points are included in one voxel, the two or more points are referred to as duplicated points. That is, in the geometry encoding process, duplicated points may be generated through geometry quantization and voxelization.

The voxelization processor 53001 may output duplicated points belonging to one voxel without merging the points, or may merge the duplicated points into one point to be output.

When the frame of the input point cloud data (i.e., the frame to which the input points belong) is an I frame, the geometry information intra-predictor 53003 according to the embodiments may apply geometry intra-prediction coding to the geometry information of the I frame. The intra-prediction coding methods may include octree coding, predictive tree coding, and trisoup coding.

To this end, reference the element assigned numeral 53002 (or referred to as a determiner) checks whether the points output from the voxelization processor 53001 belong to the I frame or the P frame.

When the frame checked by the determiner 53002 is a P frame, the LPU/PU splitter 53004 according to the embodiments splits points partitioned into tiles or slices by the spatial partitioner 51004 into LPU/PUs to support inter-prediction. In another embodiment, when the frame checked by the determiner 53002 is a P frame, the LPU/PU splitter 53004 may split the points included in the frame into LPU/PUs to support inter-prediction.

The method of splitting points of point cloud data (e.g., slice) into LPUs and/or PUs has been described in detail with reference to FIGS. 15A to 19, and thus the description thereof will be omitted below to avoid redundant description. Signaling related to LPU/PU splitting will be described in detail later.

According to the present disclosure, when the rate of change of a P frame with respect to the previous reference frame is greater than a specific threshold, intra-prediction coding may be performed on the P frame as in the case of the I frame. For example, when there is a lot of changes in the entire frame and thus the change rate is out of the range of the specific threshold, intra-prediction coding, not inter-prediction coding, may be performed on the P frame. This is because intra-prediction coding may be more accurate and efficient than inter-prediction coding when the rate of change is high. Here, the previous reference frame is provided from a reference frame buffer 53009.

To this end, an element assigned reference numeral 53005 (or referred to as a determiner) checks whether the rate of change is greater than the threshold.

When the determiner 53005 determines that the rate of change between the P frame and the reference frame is greater than the threshold, the P frame is output to the geometry information intra-predictor 53003 to perform intra prediction. When the determiner 53005 determines that the rate of change is not greater than the threshold, the P frame split into LPUs and/or PUs to perform inter prediction is output to the motion compensation application unit 53006.

The motion compensation application unit 53006 according to the embodiments determines whether to apply a motion vector for each split LPU/PU, and signals the result. For example, by checking the RDO of a specific PU, it may determine whether to apply a motion vector to the PU. In an embodiment, when applying the motion vector to the PU has a larger gain, the motion vector may be applied to the PU. In an embodiment, when applying the motion vector to the PU does not have a larger gain, the motion vector may not be applied to the PU. Here, the gain may be determined by comparing the bitstream size when the motion vector is applied. In an embodiment, information (e.g., pu_motion_compensation_type) for identifying whether a motion vector is applied to the PU may be included in the inter prediction related option information (or inter prediction related information). In this case, the motion vector applied to the PU may be a global motion vector obtained through overall motion estimation between frames, a local motion vector obtained in the PU, or both a global motion vector and a local motion vector.

That is, in the present disclosure, after splitting the point cloud data into a prediction units (PU) and obtaining a local motion vector for each PU, the local motion vector may be applied without matching the coding unit and PU so as to be applied to all of octree-based geometry coding, predictive tree-based geometry coding, and trisoup-based geometry coding.

In addition, after applying the global motion vector on the LPU, the local motion vector may be obtained through PU splitting. Then, it may be predicted through RDO whether it is beneficial to apply a local motion vector in the PU, to apply only the global motion vector, or to use the previous frame, and the prediction result may be applied to the PU. That is, depending on the optimized application method, the global motion vector or a local motion vector may be applied to the PU or the previous frame may be used. Here, using the previous frame means not to use the motion vector.

According to embodiments, when there is an optimized application method, a local motion vector, if any, may be signaled and then transmitted to the receiver for decoding.

Therefore, the receiver may determine whether a motion vector (e.g., the global motion vector) is applied to the PU based on the signaling information. When the global motion vector is applied, the receiver may perform motion compensation by applying the global motion vector to the PU.

According to embodiments, the LPU/PU splitter 53004 may split the point cloud data into LPUs and/or PUs, determine whether to apply a global motion vector to the LPU/PUs, and determine whether to signal the determination through signaling information. Then, the motion compensator 53006 may perform motion compensation for the LPU/PUs according to the signaling information.

The geometry information inter-predictor 53007 according to the embodiments may perform octree-based inter-coding, predictive-tree-based inter-coding, or trisoup-based inter-coding, based on a difference in geometry predicted value between the current frame and a reference frame in which motion compensation has been performed or a previous frame in which motion compensation has not been performed The geometry information intra-predictor 53003 may apply geometry intra-prediction coding to the geometry information of the P frame input through the determiner 53005. The intra-prediction coding method may include octree coding, predictive tree coding, and trisoup coding.

The geometry information entropy encoder 53008 according to the embodiments performs entropy encoding on the geometry information coded by the geometry information intra-predictor 53003 based on the intra prediction or the geometry information coded by the geometry information inter-predictor 53007 based on the inter prediction, and outputs a geometry bitstream (or called a geometry information bitstream).

The geometry reconstruct according to the embodiments restores (or reconstructs) geometry information based on positions changed through intra-prediction-based coding or inter-prediction-based coding, and outputs the reconstructed geometry information (or referred to as reconstructed geometry) to the attribute encoder 51007. That is, since the attribute information is dependent on the geometry information (position), the restored (or reconstructed) geometry information is needed to compress the attribute information. In addition, the reconstructed geometry information is stored in the reference frame buffer 53009 so as to be provided as a reference frame in inter-prediction coding of the P frame. The reference frame buffer 53009 also stores the reconstructed attribute information in the attribute encoder 51007. That is, the reconstructed geometry information and the reconstructed attribute information stored in the reference frame buffer 53009 may be used as a previous reference frame for geometry information inter prediction coding and attribute information inter prediction coding by the geometry information inter-predictor 53007 of the geometry encoder 51006 and the attribute information inter-predictor 55005 of the attribute encoder 51007

The color transformation processor 55001 of the attribute encoder 51007 corresponds to the color transformation unit 40006 of FIG. 4 or the color transformation processor 12008 of FIG. 12. The color transformation processor 55001 according to the embodiments performs color transformation coding of transforming color values (or textures) included in the attributes provided from the data input unit 51001 and/or the spatial partitioner 51004. For example, the color transformation processor 55001 may transform the format of color information (e.g., from RGB to YCbCr). The operation of the color transformation processor 55001 according to the embodiments may be optionally applied according to color values included in the attributes. In another embodiment, the color transformation processor 55001 may perform color transformation coding based on the reconstructed geometry.

According to embodiments, the attribute encoder 51007 may perform recoloring according to whether lossy coding is applied to the geometry information. To this end, the element assigned reference numeral 55002 (or referred to as a determiner) checks whether the geometry encoder 51006 applies lossy coding to the geometry information.

For example, when it is determined by the determiner 55002 that lossy coding has been applied to the geometry information, the recolorer 55003 performs color re-adjustment (or recoloring) to reconfigure the attribute (color) due to the lost points. That is, the recolorer 55003 may find and reconfigure an attribute value appropriate for the position of the lost point in the source point cloud data. In other words, the recolorer 55003 may predict an attribute value suitable for the changed position when the position information value is changed because scale is applied to the geometry information.

According to embodiments, the operation of the recolorer 53003 may be optionally applied according to whether duplicated points are merged. According to an embodiment, merging of the duplicated points may be performed by the voxelization processor 53001 of the geometry encoder 51006.

In an embodiment of the present disclosure, when points belonging to a voxel are merged into one point by the voxelization processor 53001, the recolorer 55003 may perform color re-adjustment (i.e., recoloring).

The recolorer 55003 performs an operation and/or method that is the same as or similar to the operation and/or method of the attribute transformation unit 40007 of FIG. 4 or the attribute transformation processor 12009 of FIG. 12.

When it is determined by the determiner 55002 that lossy coding is not applied to the geometry information, it is checked by the element assigned reference numeral 55004 (or referred to as a determiner) whether inter-prediction-based encoding is applied to the geometry information.

When it is determined by the determiner 55004 that encoding based on inter prediction is not applied to the geometry information, the attribute information intra predictor 55006 performs intra-prediction coding on the input attribute information. According to embodiments, the intra-prediction coding method carried out by the attribute information intra predictor 55006 may include predicting transform coding, lift transform coding, and RAHT coding.

When it is determined by the determiner 55004 that inter-prediction-based encoding is applied to the geometry information, the attribute information inter-predictor 55005 performs inter-prediction coding on the input attribute information. According to embodiments, the attribute information inter-predictor 55005 may code a residual based on a difference in attribute prediction value between the current frame and a motion-compensated reference frame.

The attribute information entropy encoder 55008 according to the embodiments performs entropy encoding on the attribute information encoded by the attribute information intra-predictor 55006 based on intra prediction or the attribute information encoded by the attribute information inter-predictor 55005 based on inter prediction, and outputs an attribute bitstream (or referred to as an attribute information bitstream).

The attribute reconstructor according to the embodiments restores (or reconstructs) attribute information based on attributes changed through intra-predictive coding or inter-predictive coding, and stores the reconstructed attribute information (or referred to as the reconstructed attribute) in the frame buffer 53009. That is, the reconstructed geometry information and the reconstructed attribute information stored in the reference frame buffer 53009 are may be used as a previous reference frame for inter-predictive coding of geometry information and inter-predictive coding of the attribute information by the geometry information inter-predictor 53007 and the attribute information inter-predictor 55005 of the attribute encoder 51007.

Next, the LPU/PU splitter 53004 will be described in relation to signaling.

That is, in the LPU/PU splitter 53004 may split point cloud data (e.g., points input on a per frame, tile or slice basis) into LTUs by applying reference type information (motion_block_lpu_split_type) for dividing point cloud data into LPUs to the point cloud data, and then signal the applied type information. According to embodiments, the reference type information (motion_block_lpu_split_type) for dividing the data into LPUs may include radius-based splitting, azimuth-based splitting, and elevation (or vertical)-based splitting. In an embodiment of the present disclosure, the reference type information (motion_block_lpu_split_type) for dividing the data into LPUs is included in inter prediction-related option information (or referred to as inter prediction-related information).

In splitting the point cloud data according to the reference type information (motion_block_lpu_split_type) for dividing the data into LPUs, the LPU/PU splitter 53004 may apply the reference information (e.g., motion_block_lpu_radius, motion_block_lpu_azimuth, or motion_block_lpu_elevation) to the point cloud data, and then signal the applied value. According to embodiments, the reference information for splitting into LPUs may include a radius, an azimuth, and an elevation (or vertical) (e.g., motion_block_lpu_radius, motion_block_lpu_azimuth, or motion_block_lpu_elevation). In an embodiment of the present disclosure, the reference information (e.g., motion_block_lpu_radius, motion_block_lpu_azimuth, or motion_block_lpu_elevation) for splitting into LPUs is included in inter prediction-related option information.

When a local motion vector corresponding to the LPU is present, the LPU/PU splitter 53004 may signal the motion vector. In addition, when better RDO of the predicted value is obtained by applying the global motion vector, the local motion vector may not be applied to the LPU.

According to embodiments, information indicating whether a motion vector is present (referred to as motion_vector_flag, pu_has_motion_vector_flag, or information indicating whether there is an applicable motion vector) may be signaled. In an embodiment of the present disclosure, information indicating whether a motion vector is present (motion_vector_flag or pu_has_motion_vector_flag) may be included in the inter prediction-related option information.

When a local motion vector corresponding to an LPU is present and there are various changes, the LPU/PU splitter 53004 may additionally split the LPU into one or more PUs and perform a process of finding a local motion vector for each PU. In addition, the LPU/PU splitter 53004 may calculate a gain by applying the global motion vector to each PU and determine whether to apply the global motion vector to each PU. In an embodiment, information (pu_motion_compensation_type) for identifying whether a motion vector (e.g., a global motion vector) has been applied to the PU may be included in inter prediction-related option information.

The LPU/PU splitter 53004 may split the LPU into one or more PUs by applying split reference order type information (motion_block_pu_split_type) for dividing the LPU into one or more PUs to the LPU, and then signal the applied split reference order type information (motion_block_pu_split_type). The split reference order type may include radius-based→azimuth-based→elevation (or vertical)-based splitting, radius-based→elevation (or vertical)-based→azimuth-based splitting, azimuth-based→radius-based→elevation (or vertical)-based splitting, azimuth-based→elevation (or vertical)-based→radius-based splitting, elevation (or vertical)-based→radius-based→azimuth-based splitting, and elevation (or vertical)-based→azimuth-based→radius-based splitting. In an embodiment of the present disclosure, the split reference order type information (motion_block_pu_split_type) for dividing into one or more PUs is included in the inter prediction-related option information. In the present disclosure, elevation and vertical may have the same meaning, and may be used interchangeably.

When geometry coding is performed based on an octree, the LPU/PU splitter 53004 may split the LPU in PUs by applying the octree-related reference order type information (Motion_block_pu_split_octree_type) for dividing into PUs to the octree, and then signal the applied type information. The split reference order type may include x→y→z based splitting, x→z→y based splitting, y→x→z based splitting, y→z→x based splitting, z→x→y based splitting, and z→y→x based splitting. In an embodiment of the present disclosure, the octree-related reference order type information (Motion_block_pu_split_octree_type) for dividing into PUs is included in the inter prediction-related option information.

In splitting point cloud data or the LPU into one or more PUs according to the reference type information (motion_block_pu_split_type) for dividing into PUs, the LPU/PU splitter 53004 may split the data or the LPU into one or more PUs by applying the reference information (e.g., motion_block_pu_radius, motion_block_pu_azimuth, motion_block_pu_elevation), and then signal the applied value. The reference information for splitting may include the size of the radius, the size of the azimuth, and the size of the elevation (or vertical). Alternatively, in each step of splitting into PUs, the size may be reduced to half the current size. In an embodiment of the present disclosure, information (e.g., motion_block_pu_radius, motion_block_pu_azimuth, motion_block_pu_elevation) that is a reference for splitting into PUs is included in inter prediction-related option information.

When a local motion vector corresponding to a PU is present and there are various changes, the LPU/PU splitter 53004 may perform a process of splitting the PU into one or more smaller PUs and finding a local motion vector. In this case, information indicating whether the PU has been further split into one or more smaller PUs may be signaled. In an embodiment of the present disclosure, information indicating whether the PU is further split into one or more smaller PUs is included in the inter prediction-related option information.

When a local motion vector corresponding to a PU is present, the LPU/PU splitter 53004, a signal the motion vector (pu_motion_vector_xyz). In addition, it may signal information (pu_has_motion_vector_flag) indicating whether a motion vector is present. In an embodiment of the present disclosure, the motion vector and/or information (pu_has_motion_vector_flag) indicating whether a motion vector is present may be included in the inter prediction-related option information.

The LPU/PU splitter 53004 signal whether blocks (or regions) corresponding to LPU/PUs have been split. In an embodiment of the present disclosure, information indicating whether blocks (or regions) corresponding to LPU/PUs have been split is included in inter prediction-related option information.

The LPU/PU splitter 53004 receiving the minimum PU size information (motion_block_pu_min_radius, motion_block_pu_min_azimuth, motion_block_pu_min_elevation) may perform split/local motion vector search only up to the corresponding size, and signal the corresponding value. Here, according to an embodiment, the corresponding value may be included in the inter prediction-related option information.

As such, when the frame is a P-frame, the LPU/PU splitter 53004 may split the points partitioned into slices into split regions such as LPU/PUs to support inter-prediction, and may find and assign a motion vector corresponding to each split region. The LPU may be split based on the radius. In this case, motion_block_lpu_radius may be signaled to the inter prediction-related option information and transmitted to the decoder of the receiver. Alternatively, the LPU may be split by other criteria. In this case, the splitting may be applied through motion_block_lpu_split_type, and motion_block_lpu_split_type may be included in the inter prediction-related option information and transmitted to the decoder of the receiver. PUs may be split first on the basis of elevation (or called vertical), and additional splitting may be performed on the basis of radius and azimuth. The split level may be changed according to the setting. Alternatively, splitting may be performed only based on elevation (or called vertical). Alternatively, the split order may be changed. In this case, the change may be applied through motion_block_pu_split_type, and motion_block_pu_split_type may be included in the inter prediction-related option information and transmitted to the decoder of the receiver. For example, splitting may be performed in order of azimuth→elevation (or vertical)→radius, and the split method or split reference value, motion_block_pu_elevation, motion_block_pu_azimuth, or motion_block_pu_radius may be signaled in the inter prediction-related option information.

In addition, when the frame is a P-frame, the LPU/PU splitter 53004 may splits the points partitioned into slices into split regions such as LPU/PUs to support inter-prediction, may find and assign a motion vector corresponding to each split region. In this case, it may be predicted through RDO whether it is beneficial to apply a local motion vector in the PU, to apply only the global motion vector, or to use the previous frame, and the prediction result may be applied to the PU. For example, when applying the global motion vector to the PU is the greatest benefit, the global motion vector may be applied to the PU, and information (pu_motion_compensation_type) for identifying the application may be signaled to the inter prediction-related option information and transmitted to the decoder of the receiver. That is, the motion vector may be applied to the PU according to the optimized application method. When there is an optimized application method and a local motion vector, the local motion vector may be signaled to the decoder.

And, the motion compensation application unit 53006 may determine whether to select a value obtained by applying the global motion vector to the PU or a value obtained by applying even a local motion vector or to use the point of the previous frame, based on the inter prediction-related option information, and perform motion compensation based on the determination.

In an embodiment of the present disclosure, the inter prediction-related option information may be signaled in the GPS, TPS, or geometry slice header. In this case, the inter prediction-related option information may be processed by the signaling processor 61002.

As described above, the inter prediction-related option information may include at least one of reference type information (motion_block_lpu_split_type) for splitting into LPUs, information (e.g., motion_block_lpu_radius, motion_block_lpu_azimuth, or motion_block_lpu_elevation) that is a reference for LPU splitting, information (motion_vector_flag or pu_has_motion_vector_flag) indicating whether a motion vector is present, split reference order type information (motion_block_pu_split_type) for splitting into PUs, octree-related reference order type information (Motion_block_pu_split_octree_type) for splitting into PUs, information (e.g., motion_block_pu_radius, motion_block_pu_azimuth, or motion_block_pu_elevation) that is a reference for splitting into PUs, local motion vector information corresponding to a PU, information (pu_motion_compensation_type) for identifying whether a global motion vector is applied to the PU, information indicating whether blocks (or regions) corresponding to the LPU/PUs are split, and minimum PU size information (e.g., motion_block_pu_min_radius, motion_block_pu_min_azimuth, or motion_block_pu_min_elevation). In addition, the inter prediction-related option information may further include information for identifying a tile to which the PU belongs, information for identifying a slice to which the PU belongs, information on the number of PUs included in the slice, and information for identifying each PU. In the present disclosure, information to be included in the inter prediction-related option information may be added, deleted, or modified according to those skilled in the art, and thus the embodiments are not limited to the above-described example.

Figure 22:
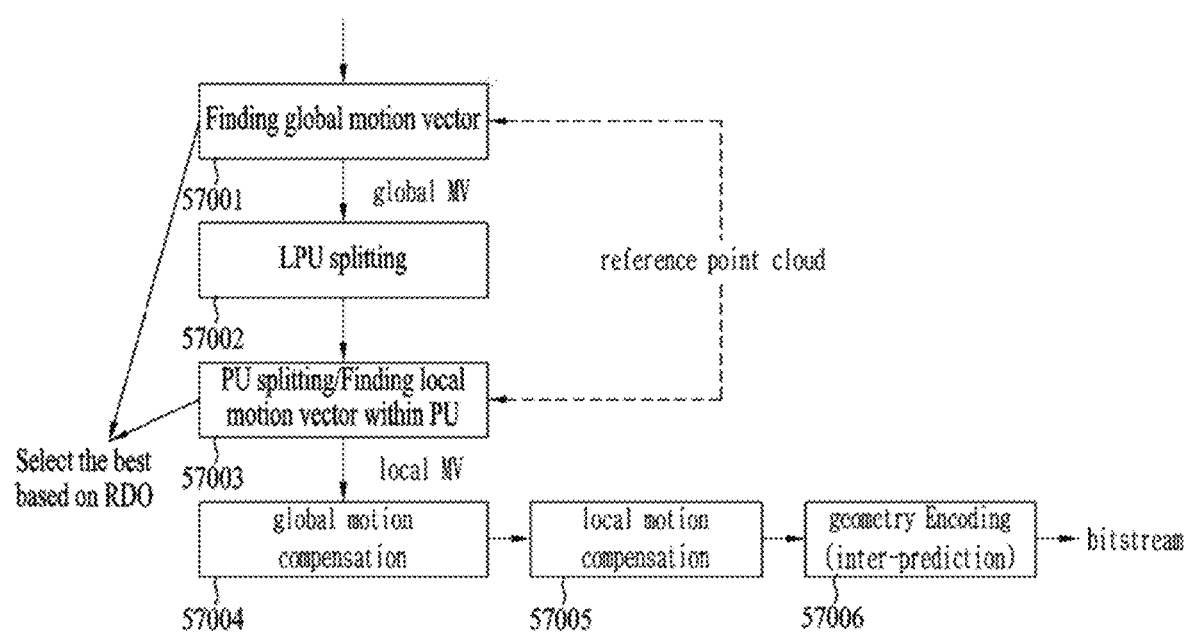
FIG. 22 is a block diagram illustrating an example of a method of encoding a geometry based on LPU/PU splitting according to embodiments.

FIG. 22 is a block diagram illustrating an example of a method of encoding a geometry based on LPU/PU splitting according to embodiments.

In FIG. 22, steps 57001 to 57003 are detailed operations of the LPU/PU splitter 53004, steps 57004 and 57005 are detailed operations of the motion compensation application unit 53007, and step 57006 is a detailed operation of the geometry information inter-predictor 53007.

That is, in step 57001, a global motion vector is found. In step 57002, the point cloud data may be split into an LPU by one or a combination of two or more of radius-based splitting, azimuth-based splitting, and elevation-based splitting in order to apply the global motion vector found in step 57001. In step 57003, when a local motion vector corresponding to the LPU is present and there are various changes, the LPU is further split into one or more PUs, and a local motion vector is found for each split PU within the PU. In steps 57001 to 57003, a best (i.e., optimal) motion vector may be selected by applying rate distortion optimization (RDO).

In addition, in steps 57001 to 57003, it is checked through RDO whether it is more beneficial to apply the global motion vector in the LPU or PU or not to apply the global motion vector in the LPU or PU to determine whether to apply the global motion vector in the LPU or PU. The result (e.g., pu_motion_compensation_type) may be signaled in the inter prediction-related option information of the signaling information.

In step 57004, global motion compensation may be performed by applying the global motion vector to the LPU or PU according to pu_motion_compensation_type. The global motion compensation may be skipped for the LPU or PU depending on pu_motion_compensation_type. Also, in step 57005, local motion compensation may be performed by applying a local motion vector to the split PU. The local motion compensation may be skipped for the PU. In step 57006, octree-based inter-coding, predictive tree-based inter-coding, or trisoup-based inter-coding may be performed based on a difference (or referred to as a residual) in the predicted value between the current frame and the motion-compensated reference frame (or the non-motion-compensated reference frame).

The geometry bitstream compressed and output by the geometry encoder 51006 based on intra prediction or inter prediction, and the attribute bitstream compressed and output by the attribute encoder 51007 based on intra prediction or inter prediction are transmitted to the transmission processor 51008.

The transmission processor 51008 according to the embodiments may perform an operation and/or transmission method identical or similar to the operation and/or transmission method of the transmission processor 12012 of FIG. 12, and perform an operation and/or transmission method identical or similar to the operation and/or transmission method of the transmitter 10003 of FIG. 1. For details, reference will be made to the description of FIG. 1 or 12.

The transmission processor 51008 according to the embodiments may transmit the geometry bitstream output from the geometry encoder 51006, the attribute bitstream output from the attribute encoder 51007, and the signaling bitstream output from the signaling processor 51005, respectively, or may multiplex the bitstreams into one bitstream to be transmitted.

The transmission processor 51008 according to the embodiments may encapsulate the bitstream into a file or segment (e.g., a streaming segment) and then transmit the encapsulated bitstream over various networks such as a broadcasting network and/or a broadband network.

The signaling processor 51005 according to the embodiments may generate and/or process signaling information and output the same to the transmission processor 51008 in the form of a bitstream. The signaling information generated and/or processed by the signaling processor 51005 will be provided to the geometry encoder 51006, the attribute encoder 51007, and/or the transmission processor 51008 for geometry encoding, attribute encoding, and transmission processing. Alternatively, the signaling processor 51005 may receive signaling information generated by the geometry encoder 51006, the attribute encoder 51007, and/or the transmission processor 51008.

In the present disclosure, the signaling information may be signaled and transmitted on a per parameter set (sequence parameter set (SPS), geometry parameter set (GPS), attribute parameter set (APS), tile parameter set (TPS), or the like) basis. Also, it may be signaled and transmitted on the basis of a coding unit of each image, such as slice or tile. In the present disclosure, signaling information may include metadata (e.g., set values) related to point cloud data, and may be provided to the geometry encoder 51006, the attribute encoder 51007, and/or the transmission processor 51008 for geometry encoding, attribute encoding, and transmission processing. Depending on the application, the signaling information may also be defined at the system side, such as a file format, dynamic adaptive streaming over HTTP (DASH), or MPEG media transport (MMT), or at the wired interface side, such as high definition multimedia interface (HDMI), Display Port, Video Electronics Standards Association (VESA), or CTA.

A method/device according to the embodiments may signal related information to add/perform an operation of the embodiments. The signaling information according to the embodiments may be used by a transmission device and/or a reception device.

In an embodiment of the present disclosure, inter prediction-related option information to be used for inter prediction of geometry information may be signaled in at least one of a geometry parameter set, a tile parameter set, and a geometry slice header. Alternatively, it may be signaled in a separate PU header (referred to as geom_pu_header).

Figure 23:
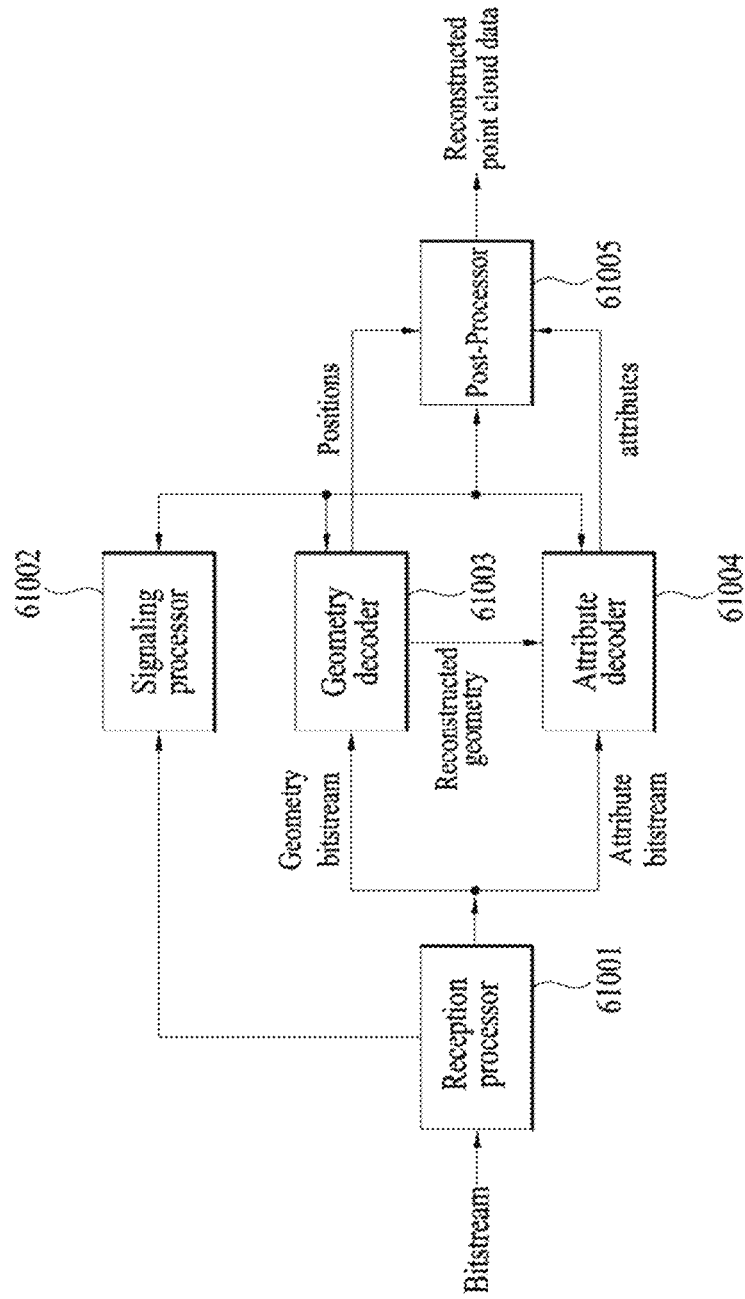
FIG. 23 is a diagram illustrating another example of a point cloud reception device according to embodiments.

FIG. 23 is a diagram showing another exemplary point cloud reception device according to embodiments.

The point cloud reception device according to the embodiments may include a reception processor 61001, a signaling processor 61002, a geometry decoder 61003, an attribute decoder 61004, and a post-processor 61005. According to embodiments, the geometry decoder 61003 and the attribute decoder 61004 may be referred to as a point cloud video decoder. According to embodiments, the point cloud video decoder may be referred to as a PCC decoder, a PCC decoding unit, a point cloud decoder, a point cloud decoding unit, or the like.

The point cloud reception device of FIG. 23 may correspond to the reception device 10004, the receiver 10005, the point cloud video decoder 10006 of FIG. 1, the transmission-decoding-rendering 20002-20003-20004 of FIG. 2, the point cloud video decoder of FIG. 11, the reception device of FIG. 13, the device of FIG. 14, or the like. Each component in FIG. 23 and the corresponding figures may correspond to software, hardware, a processor connected to a memory, and/or a combination thereof.

The reception processor 61001 according to the embodiments may receive a single bitstream, or may receive a geometry bitstream (also called geometry information bitstream), an attribute bitstream (also called attribute information bitstream), and a signaling bitstream, respectively. When a file and/or segment is received, the reception processor 61001 according to the embodiments may decapsulate the received file and/or segment and output the decapsulated file and/or segment as a bitstream.

When the single bitstream is received (or decapsulated), the reception processor 61001 according to the embodiments may demultiplex the geometry bitstream, the attribute bitstream, and/or the signaling bitstream from the single bitstream. The reception processor 61001 may output the demultiplexed signaling bitstream to the signaling processor 61002, the geometry bitstream to the geometry decoder 61003, and the attribute bitstream to the attribute decoder 61004.

When the geometry bitstream, the attribute bitstream, and/or the signaling bitstream are received (or decapsulated), respectively, the reception processor 61001 according to the embodiments may deliver the signaling bitstream to the signaling processor 61002, the geometry bitstream to the geometry decoder 61003, and the attribute bitstream to the attribute decoder 61004.

The signaling processor 61002 may parse signaling information, for example, information contained in the SPS, GPS, APS, TPS, metadata, or the like from the input signaling bitstream, process the parsed information, and provide the processed information to the geometry decoder 61003, the attribute decoder 61004, and the post-processor 61005. In another embodiment, signaling information contained in the geometry slice header and/or the attribute slice header may also be parsed by the signaling processor 61002 before decoding of the corresponding slice data. That is, when the point cloud data is partitioned into tiles and/or slices at the transmitting side, the TPS includes the number of slices included in each tile, and accordingly the point cloud video decoder according to the embodiments may check the number of slices and quickly parse the information for parallel decoding.

Accordingly, the point cloud video decoder according to the present disclosure may quickly parse a bitstream containing point cloud data as it receives an SPS having a reduced amount of data. The reception device may decode tiles upon receiving the tiles, and may decode each slice based on the GPS and APS included in each tile. Thereby, decoding efficiency may be maximized. Alternatively, the reception device may maximize decoding efficiency by inter-prediction decoding the point cloud data for each PU based on inter prediction-related option information signaled in the GPS, TPS, geometry slice header and/or PU header.

That is, the geometry decoder 61003 may reconstruct the geometry by performing the reverse process of the operation of the geometry encoder 51006 of FIG. 20 on the compressed geometry bitstream based on signaling information (e.g., geometry related parameters). The geometry restored (or reconstructed) by the geometry decoder 61003 is provided to the attribute decoder 61004. Here, the geometry-related parameters may include inter-prediction-related option information to be used for inter-prediction reconstruction of the geometry information.

The attribute decoder 61004 may restore the attribute by performing the reverse process of the operation of the attribute encoder 51007 of FIG. 20 on the compressed attribute bitstream based on signaling information (e.g., attribute related parameters) and the reconstructed geometry. According to embodiments, when the point cloud data is partitioned into tiles and/or slices at the transmitting side, the geometry decoder 61003 and the attribute decoder 61004 perform geometry decoding and attribute decoding on a tile-by-tile basis and/or slice-by-slice basis.

Figure 24:
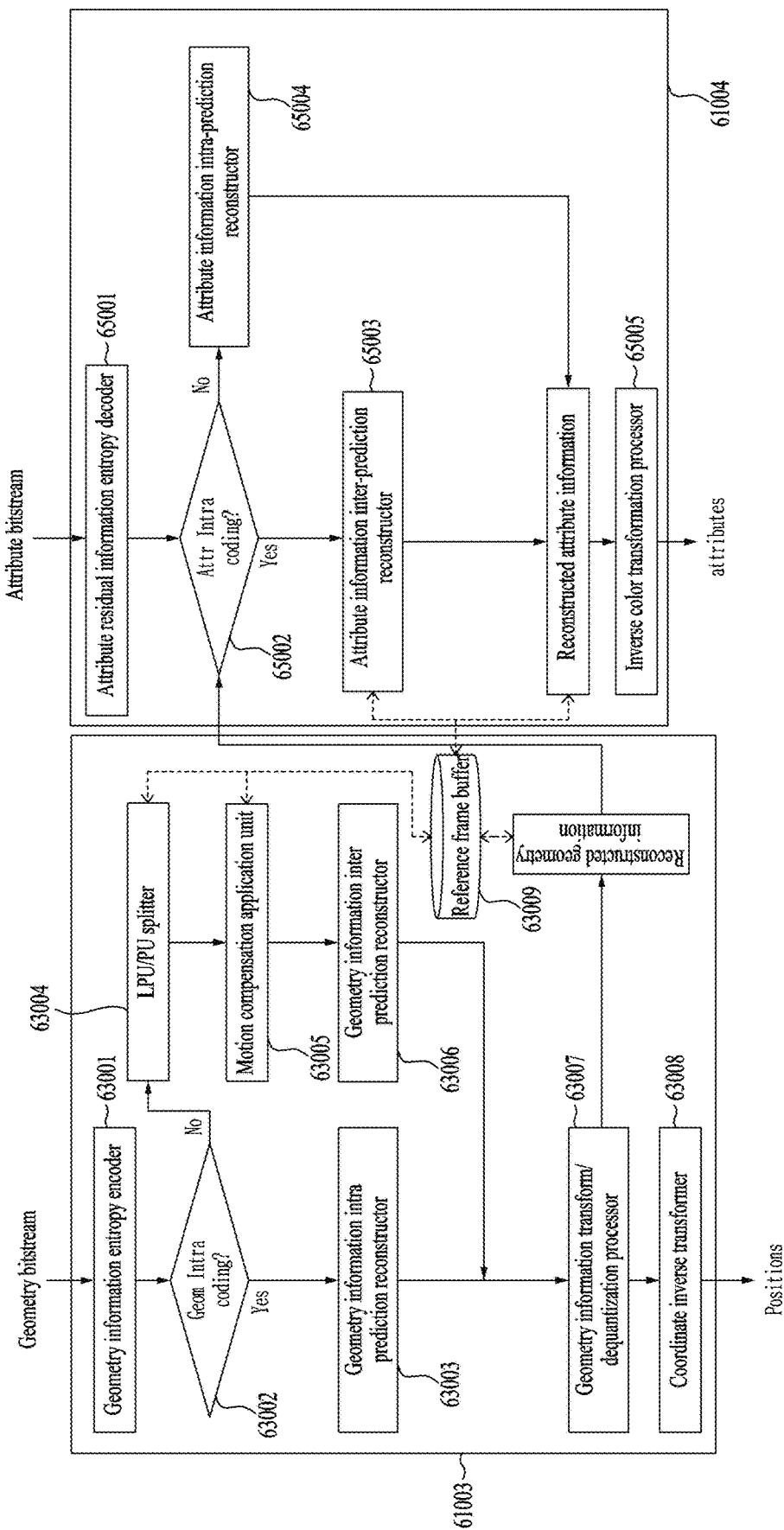
FIG. 24 is a diagram illustrating an example of operations of a geometry decoder and an attribute decoder according to embodiments.

FIG. 24 is a diagram illustrating an example of operations of the geometry decoder 61003 and the attribute decoder 61004 according to embodiments.

The geometry information entropy encoder 63001, the dequantization processor 63007, and the coordinate inverse transformer 63008 included in the geometry decoder 61003 of FIG. 24 may perform some or all of the operations of the arithmetic decoder 11000 and the coordinate inverse transformation unit 11004 of FIG. 11, or perform some or all of the operations of the arithmetic decoder 13002 and the inverse quantization processor 13005 of FIG. 13. The positions reconstructed by the geometry decoder 61003 are output to the post-processor 61005.

According to embodiments, when the inter-prediction-related option information for inter-prediction reconstruction of geometry information is signaled through at least one of a geometry parameter set (GPS), a tile parameter set (TPS), a geometry slice header, and a geometry PU header, it may be obtained by the signaling processor 61002 and provided to the geometry decoder 61003, or may be obtained directly by the geometry decoder 61003.

According to embodiments, the inter prediction-related option information may include at least one of reference type information (motion_block_lpu_split_type) for splitting into LPUs, information (e.g., motion_block_lpu_radius, motion_block_lpu_azimuth, or motion_block_lpu_elevation) that is a reference for LPU splitting, information (motion_vector_flag or pu_has_motion_vector_flag) indicating whether an applicable motion vector is present, split reference order type information (motion_block_pu_split_type) for splitting into PUs, octree-related reference order type information (Motion_block_pu_split_octree_type) for splitting into PUs, information (e.g., motion_block_pu_radius, motion_block_pu_azimuth, or motion_block_pu_elevation) that is a reference for splitting into PUs, local motion vector information corresponding to a PU, information (pu_motion_compensation_type) for identifying whether a motion vector (e.g., a global motion vector) is applied to the PU, information indicating whether blocks (or regions) corresponding to the LPU/PUs are split, and minimum PU size information (e.g., motion_block_pu_min_radius, motion_block_pu_min_azimuth, or motion_block_pu_min_elevation). In addition, the inter prediction-related option information may further include information for identifying a tile to which the PU belongs, information for identifying a slice to which the PU belongs, information on the number of PUs included in the slice, and information for identifying each PU. In the present disclosure, information to be included in the inter prediction-related option information may be added, deleted, or modified according to those skilled in the art, and thus the embodiments are not limited to the above-described example.

That is, the geometry information entropy decoder 63001 entropy-decodes an input geometry bitstream.

According to embodiments, when intra-prediction-based encoding is applied to the geometry information at the transmitting side, the geometry decoder 61003 performs intra-prediction-based reconstruction on the geometry information. On the other hand, when inter-prediction-based encoding is applied to the geometry information at the transmitting side, the geometry decoder 61003 performs inter-prediction-based reconstruction on the geometry information.

To this end, the element, the assigned reference numeral 63002 (or referred to as a determiner) checks whether intra prediction-based coding or inter-prediction-based coding is applied to the geometry information.

When it is determined by the determiner 63002 that intra prediction-based coding is applied to the geometry information, the entropy-decoded geometry information is provided to the geometry information intra prediction reconstructor 63003. On the other hand, when it is determined by the determiner 63002 that inter prediction-based coding is applied to the geometry information, the entropy-decoded geometry information is output to the LPU/PU splitter 63004.

The geometry information intra prediction reconstructor 63003 decodes and reconstructs geometry information based on the intra prediction method. That is, the geometry information intra-prediction reconstructor 63003 may reconstruct geometry information predicted by the geometry intra-prediction coding. The intra-prediction coding method may include octree-based coding, and predictive-tree-based coding, trisoup-based coding.

When the frame of geometry information to be decoded is a P frame, the LPU/PU splitter 63004 splits a reference frame into LPU/PUs using a inter prediction-related option information signaled to support inter-prediction-based reconstruction and indicate LPU/PU split.

The motion compensation application unit 63005 according to the embodiments may generate predicted geometry information by applying a motion vector (e.g., a global motion vector and/or a local motion vector) to the LPU/PU split from the reference frame. Here, the motion vector may be received through the signaling information.

The motion compensation application unit 63005 may perform motion compensation by applying the global motion vector to the PU according to pu_motion_compensation_type included in the inter prediction-related option information.

The motion compensation application unit 63005 may perform motion compensation by applying a local motion vector to the PU according to pu_motion_compensation_type included in the inter prediction-related option information.

The motion compensation application unit 63005 may skip the motion compensation for the PU according to pu_motion_compensation_type included in the inter prediction-related option information.

The geometry information inter prediction reconstructor 63006 according to embodiments decodes and reconstructs geometry information based on the inter prediction method. That is, the geometry information coded by the geometry inter prediction may be reconstructed based on the geometry information of the motion-compensated reference frame (or the non-motion-compensated reference frame). The inter-prediction coding method according to the embodiments may include octree-based inter-coding, predictive-tree-based inter-coding method, and trisoup-based inter-coding.

The geometry information reconstructed by the geometry information intra prediction reconstructor 63003 or the geometry information reconstructed by the geometry information inter prediction reconstructor 63006 is input to the geometry information inverse transform/dequantization processor 63007.

The geometry information inverse transform/dequantization processor 63007 performs the reverse process of transformation performed by the geometry information transformation/quantization processor 51003 of the transmitter on the reconstructed geometry information, and the result may be multiplied by a scale (=geometry quantization value) to generate the reconstructed geometry information through dequantization. That is, the geometry information transform/dequantization processor 63007 may dequantize the geometry information by applying the scale (scale=geometry quantization value) included in the signaling information to the x, y, and z values of the geometric position of the reconstructed point.

The coordinate inverse transformer 63008 may perform a reverse process of the coordinate transformation performed by the coordinate transformation unit 51002 of the transmitter on the dequantized geometry information. For example, the coordinate inverse transformer 63008 may reconstruct the changed xyz axes on the transmitting side or inversely transform the transformed coordinates into xyz rectangular coordinates.

According to embodiments, the geometry information dequantized by the geometry information transform/dequantization processor 63007 is stored in the reference frame buffer 63009 through a geometry reconstruction process, and is also output to the attribute decoder 61004 for attribute decoding.

According to embodiments, the attribute residual information entropy decoder 65001 of the attribute decoder 61004 may entropy-decode an input attribute bitstream.

According to embodiments, when the encoding based on intra prediction is applied to the attribute information at the transmitting side, the attribute decoder 61004 performs intra prediction-based reconstruction on the attribute information. On the other hand, when encoding based on inter prediction is applied to the attribute information at the transmitting side, the attribute decoder 61004 performs inter prediction-based reconstruction on the attribute information.

To this end, the element assigned reference numeral 65002 (or referred to as a determiner) checks whether intra-prediction-based coding or inter-prediction-based coding is applied to the attribute information.

When the determiner 65002 determines that intra prediction-based coding is applied to the attribute information, the entropy-decoded attribute information is provided to the attribute information intra prediction reconstructor 65004. On the other hand, when the determiner 65002 determines that inter-prediction-based coding is applied to the attribute information, the entropy-decoded attribute information is provided to the attribute information inter-prediction reconstructor 65003.

The attribute information inter-prediction reconstructor 65003 decodes and reconstructs the attribute information based on the inter prediction method. That is, the attribute information predicted by inter prediction coding is reconstructed.

The attribute information intra-prediction reconstructor 65004 decodes and reconstructs the attribute information based on the intra prediction method. That is, the attribute information predicted by intra-prediction coding is reconstructed. The intra coding method may include predicting transform coding, lift transform coding, and RAHT coding.

According to embodiments, the reconstructed attribute information may be stored in the reference frame buffer 63009. The geometry information and attribute information stored in the reference frame buffer 63009 may be provided to the geometry information inter-prediction reconstructor 63003 and the attribute information inter-prediction reconstructor 65003 as a previous reference frame.

The inverse color transformation processor 65005 performs inverse transform coding for inverse transformation of the color values (or textures) included in the reconstructed attribute information, and then outputs the attributes to the post-processor 61005. The inverse color transformation processor 65005 performs an operation and/or inverse transform coding identical or similar to the operation and/or inverse transform coding of the inverse color transformation unit 11010 of FIG. 11 or the inverse color transformation processor 13010 of FIG. 13.

The post-processor 61005 may reconstruct point cloud data by matching the geometry information (i.e., positions) reconstructed and output by the geometry decoder 61003 with the attribute information reconstructed and output by the attribute decoder 61004. In addition, when the reconstructed point cloud data is in a tile and/or slice unit, the post-processor 61005 may perform a reverse process to the spatial partitioning of the transmitting side based on the signaling information.

Next, the LPU/PU splitter 63004 of the geometry decoder 61003 will be described in relation to signaling. In an embodiment, the signaling processor 61002 reconstructs inter-prediction-related option information received in at least one of the GPS, TPS, geometry slice header and/or geometry PU header and provides the same to the LPU/PU splitter 63004.

The LPU/PU splitter 63004 may split the reference frame into LPUs by applying the reference type information (motion_block_lpu_split_type) for dividing the reference frame into LPUs to the reference frame, and then reconstruct the transmitted motion vector. In an embodiment of the present disclosure, the reference type information (motion_block_lpu_split_type) for dividing into LPUs is received in at least one of the GPS, TPS, or geometry slice header.

In splitting the reference frame by applying the reference type information (motion_block_lpu_split_type) for dividing into LPUs, the LPU/PU splitter 63004 may split the reference frame by applying the reference information (e.g., motion_block_lpu_radius, motion_block_lpu_azimuth, or motion_block_lpu_elevation) to the reference frame. According to embodiments, the reference information for splitting into LPUs may include a radius size, an azimuth, and an elevation (or vertical) (e.g., motion_block_lpu_radius, motion_block_lpu_azimuth, or motion_block_lpu_elevation). In an embodiment of the present disclosure, the reference information (e.g., motion_block_lpu_radius, motion_block_lpu_azimuth, or motion_block_lpu_elevation) for splitting into LPUs is included and received in at least one of the GPS, TPS, or geometry slice header.

When the information (motion_vector_flag or pu_has_motion_vector_flag) indicating whether a motion vector corresponding to the LPU is present indicates that an applicable motion vector is present, the LPU/PU splitter 63004 may reconstruct the motion vector. In an embodiment of the present disclosure, the information (motion_vector_flag or pu_has_motion_vector_flag) indicating whether a motion vector corresponding to the LPU is present and the corresponding motion vector are included and received in at least one of the GPS, TPS, or geometry slice header.

When the information indicating whether the LPU is split into PUs indicates that the LPU is split into PUs, the LPU/PU splitter 63004, may further split the LPU into one or more PUs.

The LPU/PU splitter 63004 may split the LPU into one or more PUs by applying the reference order type information (motion_block_pu_split_type) for dividing into PUs to the LPU. The split reference order type may include radius-based→azimuth-based→elevation (or vertical)-based splitting, radius-based→elevation (or vertical)-based→azimuth-based splitting, azimuth-based→radius-based→elevation (or vertical)-based splitting, azimuth-based→elevation (or vertical)-based→radius-based splitting, elevation (or vertical)-based→radius-based→azimuth-based splitting, and elevation (or vertical)-based→azimuth-based→radius-based splitting. In an embodiment of the present disclosure, the reference order type information (motion_block_pu_split_type) for dividing into PUs is included and received in at least one of the GPS, TPS, or geometry slice header.

When geometry coding is applied based on an octree, the LPU/PU splitter 63004 may split the octree structure into one or more PUs based on the octree-related reference order type (motion_block_pu_split_octree_type) for dividing into PUs. The octree-related reference order type for dividing into PUs may include x→y→z based splitting, x→z→y based splitting, y→x→z based splitting, y→z→x based splitting, z→x→y based splitting, and z→y→x based splitting. In an embodiment of the present disclosure, the octree-related reference order type (motion_block_pu_split_octree_type) for dividing into PUs is included and received in at least one of the GPS, TPS, or geometry slice header.

In splitting an LPU into PUs according to the reference type information (motion_block_pu_split_type) for dividing into PUs, the LPU/PU splitter 63004 may the LPU into one or more PUs by applying the information (e.g., motion_block_pu_radius, motion_block_pu_azimuth, or motion_block_pu_elevation) as a reference to the LPU. The information that is a reference for splitting may include a radius, an azimuth, and an elevation (or vertical). In an embodiment of the present disclosure, the information (e.g., motion_block_pu_radius, motion_block_pu_azimuth, or motion_block_pu_elevation) that is a reference for splitting into PUs may be included and received in at least one of the GPS, TPS, or geometry slice header.

The LPU/PU splitter 63004 may split the PU again by applying the minimum PU size information (e.g., motion_block_pu_min_radius, motion_block_pu_min_azimuth, or motion_block_pu_min_elevation) to the PU. In an embodiment of the present disclosure, the minimum PU size information (e.g., motion_block_pu_min_radius, motion_block_pu_min_azimuth, or motion_block_pu_min_elevation) may be included and received in at least one of the GPS, TPS, or geometry slice header.

In the present disclosure, the inter prediction-related option information may include at least one of reference type information (motion_block_lpu_split_type) for splitting into LPUs, information (e.g., motion_block_lpu_radius, motion_block_lpu_azimuth, or motion_block_lpu_elevation) that is a reference for LPU splitting, information (motion_vector_flag or pu_has_motion_vector_flag) indicating whether an applicable motion vector is present, split reference order type information (motion_block_pu_split_type) for splitting into PUs, octree-related reference order type information (Motion_block_pu_split_octree_type) for splitting into PUs, information (e.g., motion_block_pu_radius, motion_block_pu_azimuth, or motion_block_pu_elevation) that is a reference for splitting into PUs, local motion vector information corresponding to a PU, information (pu_motion_compensation_type) for identifying whether a global motion vector is applied to the PU, information indicating whether blocks (or regions) corresponding to the LPU/PUs are split, and minimum PU size information (e.g., motion_block_pu_min_radius, motion_block_pu_min_azimuth, or motion_block_pu_min_elevation). In the present disclosure, information to be included in the inter prediction-related option information may be added, deleted, or modified according to those skilled in the art, and thus the embodiments are not limited to the above-described example.

The motion compensation application unit 63005 may perform motion compensation according to pu_motion_compensation_type included in the inter prediction-related option information. For example, the motion compensation application unit 63005 may identify whether to select a value obtained by applying the global motion vector to the PU or a value obtained by applying even a local motion vector or to use the point of the previous frame based on pu_motion_compensation_type, and perform motion compensation on the PU according to the identification result. That is, the motion compensation application unit 63005 may generate a predicted point cloud by applying a motion vector to the split LPU/PU according to the optimized application method (pu_motion_compensation_type). This process may be performed before geometry coding, or may be performed together with the geometry coding when the PU matches the geometry coding execution unit.

Figure 25:
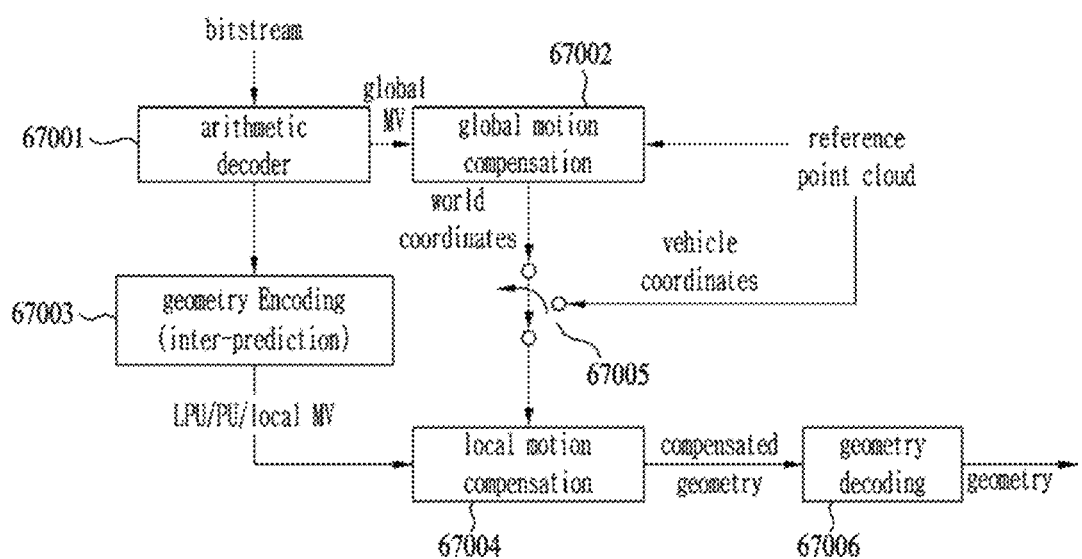
FIG. 25 is a block diagram illustrating an example of a method of decoding a geometry based on LPU/PU splitting according to embodiments.

FIG. 25 is a block diagram illustrating an example of a method of decoding a geometry based on LPU/PU splitting according to embodiments.

In FIG. 25, step 67001 is a detailed operation of the geometry information entropy encoder 63001, step 67003 is a detailed operation of the LPU/PU splitter 63004, and steps 67002 and 67004 are detailed operations of the motion compensation application unit 67005. Step 67006 is a detailed operation of the geometry information inter prediction reconstructor 63006.

That is, in step 67001, entropy decoding is performed on the geometry bitstream. An example of entropy decoding is arithmetic decoding.

In step 67002, global motion compensation is performed by applying a global motion vector to the entropy-decoded geometry information. In step 67003, the entropy-decoded geometry information is split into LPU/PUs. In step 67004 local motion compensation may be performed by applying a local motion vector to the split LPU/PUs. The local motion compensation may be skipped. In addition, in step 67004, global motion compensation may be performed by applying a global motion vector to the LPU/PUs. The global motion compensation may be skipped. In this regard, whether to perform the global motion compensation by applying the global motion vector to the LPU and/or PUs may be identified based on pu_motion_compensation_type included in the inter prediction-related option information. In an embodiment of the present disclosure, the global motion vector and/or the local motion vector are included and received in at least one of the GPS, TPS, geometry slice header, or geometry PU header. The LPU/PU splitting has been described in detail above, a description thereof will be skipped below.

The previous reference frame (i.e., reference point cloud) stored in the reference frame buffer may be provided to step 67002 to perform global motion compensation.

For local motion compensation, either the world coordinates subjected to global motion compensation in step 67002 or vehicle coordinates of a previous reference frame (i.e., reference point cloud) may be provided to step 67004.

In step 67004, the local motion-compensated geometry information is decoded and reconstructed based on inter prediction.

FIG. 26 illustrates an example of a bitstream structure of point cloud data for transmission/reception according to embodiment.

According to embodiments, in FIG. 26, the term "slice" may be referred to as "data unit".

In addition, in FIG. 26, Each abbreviation has the following meaning. Each abbreviation may be referred to by another term within the scope of the equivalent meaning. SPS: Sequence Parameter Set; GPS: Geometry Parameter Set; APS: Attribute Parameter Set; TPS: Tile Parameter Set; Geom: Geometry bitstream=geometry slice header+[geometry PU header+Geometry PU data] geometry slice data); Attr: attributes (Attribute bitstream=attribute data unit header+[attribute PU header+attribute PU data] attribute data unit data).

The present disclosure may signal related information in order to add/perform the embodiments described so far. Signaling information according to embodiments may be used in a point cloud video encoder at the transmitting side or a point cloud video decoder at the receiving side.

The point cloud video encoder according to the embodiments may generate a bitstream as shown in FIG. 26 by encoding geometry information and attribute information as described above. In addition, signaling information related to the point cloud data may be generated and processed in at least one of the geometry encoder, the attribute encoder, or the signaling processor of the point cloud video encoder, and may be included in the bitstream.

As an example, the point cloud video encoder configured to perform geometry encoding and/or attribute encoding may generate an encoded point cloud (or a bitstream including the point cloud) as shown in FIG. 26. In addition, signaling information related to the point cloud data may be generated and processed by the metadata processor of the point cloud data transmission device, and be included in the point cloud as shown in FIG. 26.

The signaling information according to the embodiments may be received/obtained by at least one of the geometry decoder, the attribute decoder, or the signaling processor of the point cloud video decoder.

A bitstream according to embodiments may be divided into a geometry bitstream, an attribute bitstream, and a signaling bitstream and transmitted/received, or one combined bitstream may be transmitted/received.

When a geometry bitstream, an attribute bitstream, and a signaling bitstream according to embodiments are configured as one bitstream, the bitstream may include one or more sub-bitstreams. The bitstream according to the embodiments may include a sequence parameter set (SPS) for sequence level signaling, a geometry parameter set (GPS) for signaling of geometry information coding, one or more attribute parameter sets (APSs) (APS0, APS1) for signaling of attribute information coding, a tile parameter set (TPS) for tile level signaling, and one or more slices (slice 0 to slice n). That is, a bitstream of point cloud data according to embodiments may include one or more tiles, and each of the tiles may be a group of slices including one or more slices (slice 0 to slice n). The TPS according to the embodiments may contain information about each of the one or more tiles (e.g., coordinate value information and height/size information about the bounding box). Each slice may include one geometry bitstream (Geom0) and one or more attribute bitstreams (Attr0 and Attrn). For example, a first slice (slice 0) may include one geometry bitstream (Geom0) and one or more attribute bitstreams (Attr0, Attrn).

Each slice or geometry bitstream (or called geometry slice) may be composed of a geometry slice header and one or more geometry PUs (Geom PU0, Geom PU1). Each geometry PU may be composed of a geometry PU header (geom PU header) and geometry PU data (geom PU data).

Each attribute bitstream (or called an attribute slice) in each slice may be composed of an attribute slice header and one or more attribute PUs (Attr PU0, Attr PU1). Each attribute PU may be composed of an attribute PU header (attr PU header) and attribute PU data (attr PU data).

According to embodiments, inter-prediction-related option information may be added to and signaled in the GPS and/or the TPS.

According to embodiments, the inter-prediction-related option information may be added to and signaled in the geometry slice header for each slice.

According to embodiments, the inter-prediction-related option information may be signaled in the geometry PU header.

According to embodiments, parameters required for encoding and/or decoding of point cloud data may be newly defined in parameter sets (e.g., SPS, GPS, APS, and TPS (or referred to as a tile inventory), etc.) of the point cloud data and/or the header of the corresponding slice. For example, they may be added to the GPS in encoding and/or decoding of geometry information, and may be added to the tile (TPS) and/or slice header in tile-based encoding and/or decoding. Also, when PU-based encoding and/or decoding is performed, the parameters may be added to the geometry PU header and/or attribute PU header.

As shown in FIG. 26, the bitstream of the point cloud data is divided into tiles, slices, LPUs, and/or PUs such that the point cloud data may be divided into regions and processed. The regions of the bitstream may have different importance levels. Accordingly, when the point cloud data is partitioned into tiles, different filters (encoding methods) or different filter units may be applied to the respective tiles. When the point cloud data is partitioned into slices, different filters or different filter units may be applied to the respective slices. In addition, when the point cloud data is divided into PUs, different filters and different filter units may be applied to the PUs, respectively.

By transmitting the point cloud data according to the bitstream structure as shown in FIG. 26, the transmission device according to the embodiments may allow the encoding operation to be applied differently according to the importance level, and allow a good-quality encoding method to be used in an important region. In addition, it may support efficient encoding and transmission according to the characteristics of the point cloud data and provide attribute values according to user requirements.

As the reception device according to the embodiments receives the point cloud data according to the bitstream structure as shown in FIG. 26, it may apply different filtering (decoding methods) to the respective regions (divided into tiles or slices) according to the processing capacity of the reception device, rather than using a complex decoding (filtering) method to the entire point cloud data. Thereby, a better image quality may be provided for regions important to the user and appropriate latency may be ensured in the system.

As described above, a tile or a slice is provided to process the point cloud data by partitioning the point cloud data by region. In partitioning the point cloud data by region, an option to generate a different set of neighbor points for each region may be set. Thereby, a selection method having low complexity and slightly lower reliability, or a selection method having high complexity and high reliability I may be provided.

According to embodiments, at least one of the GPS, TPS, geometry slice header, or geometry PU header may include inter prediction-related option information. According to embodiments, the inter prediction-related option information may include reference type information (motion_block_lpu_split_type) for splitting into LPUs, information (e.g., motion_block_lpu_radius, motion_block_lpu_azimuth, or motion_block_lpu_elevation) that is a reference for LPU splitting, information (motion_vector_flag or pu_has_motion_vector_flag) indicating whether a motion vector is present, split reference order type information (motion_block_pu_split_type) for splitting into PUs, octree-related reference order type information (Motion_block_pu_split_octree_type) for splitting into PUs, information (e.g., motion_block_pu_radius, motion_block_pu_azimuth, or motion_block_pu_elevation) that is a reference for splitting into PUs, local motion vector information corresponding to a PU, information indicating whether blocks (or regions) corresponding to the LPU/PUs are split, and minimum PU size information (e.g., motion_block_pu_min_radius, motion_block_pu_min_azimuth, or motion_block_pu_min_elevation). In addition, the inter prediction-related option information may further include information for identifying a tile to which the PU belongs, information for identifying a slice to which the PU belongs, information on the number of PUs included in the slice, and information for identifying each PU.

Afield, which is a term used in syntaxes that will be described later in the present disclosure, may have the same meaning as a parameter or a syntax element.

FIG. 27 shows an embodiment of a syntax structure of a sequence parameter set (SPS) (seq_parameter_set_rbsp( )) according to the present disclosure. The SPS may include sequence information about a point cloud data bitstream. In particular, in this example, the SPS includes neighbor point selection-related option information.

The SPS according to the embodiments may include a profile_idc_field, a profile_compatibility_flags field, a level_idc field, an sps_bounding_box_present_flag field, an sps_source_scale_factor field, an sps_seq_parameter_set_id field, an sps_num_attribute_sets field, and an sps_extension_ present_flag field.

The profile_idc_field indicates a profile to which the bitstream conforms.

The profile_compatibility_flags field equal to 1 may indicate that the bitstream conforms to the profile indicated by profile_idc.

The level_idc field indicates a level to which the bitstream conforms.

The sps_bounding_box_present_flag field indicates whether source bounding box information is signaled in the SPS. The source bounding box information may include offset and size information about the source bounding box. For example, the sps_bounding_box_present_flag field equal to 1 indicates that the source bounding box information is signaled in the SPS. The sps_bounding_box_present_flag field equal to 0 indicates the source bounding box information is not signaled. The sps_source_scale_factor field indicates the scale factor of the source point cloud.

The sps_seq_parameter_set_id field provides an identifier for the SPS for reference by other syntax elements.

The sps_num_attribute_sets field indicates the number of coded attributes in the bitstream.

The sps_extension_present_flag field specifies whether the sps_extension_data syntax structure is present in the SPS syntax structure. For example, the sps_extension_present_ flag field equal to 1 specifies that the sps_extension_data syntax structure is present in the SPS syntax structure. The sps_extension_present_flag field equal to 0 specifies that this syntax structure is not present. When not present, the value of the sps_extension_present_flag field is inferred to be equal to 0.

When the sps_bounding_box_present_flag field is equal to 1, the SPS according to embodiments may further include an sps_bounding_box_offset_x field, an sps_bounding_box_offset_y field, an sps_bounding_box_offset_z field, an sps_bounding_box_scale_factor field, an sps_bounding_box_size_width field, an sps_bounding_box_size_height field, and an sps_bounding_box_size_depth field.

The sps_bounding_box_offset_x field indicates the x offset of the source bounding box in the Cartesian coordinates. When the x offset of the source bounding box is not present, the value of sps_bounding_box_offset_x is 0.

The sps_bounding_box_offset_y field indicates the y offset of the source bounding box in the Cartesian coordinates. When the y offset of the source bounding box is not present, the value of sps_bounding_box_offset_y is 0.

The sps_bounding_box_offset_z field indicates the z offset of the source bounding box in the Cartesian coordinates.

When the z offset of the source bounding box is not present, the value of sps_bounding_box_offset_z is 0.

The sps_bounding_box_scale_factor field indicates the scale factor of the source bounding box in the Cartesian coordinates. When the scale factor of the source bounding box is not present, the value of sps_bounding_box_scale_factor may be 1.

The sps_bounding_box_size_width field indicates the width of the source bounding box in the Cartesian coordinates. When the width of the source bounding box is not present, the value of the sps_bounding_box_size_width field may be 1.

The sps_bounding_box_size_height field indicates the height of the source bounding box in the Cartesian coordinates. When the height of the source bounding box is not present, the value of the sps_bounding_box_size_height field may be 1.

The sps_bounding_box_size_depth field indicates the depth of the source bounding box in the Cartesian coordinates. When the depth of the source bounding box is not present, the value of the sps_bounding_box_size_depth field may be 1.

The SPS according to embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension[i] field, an attribute_instance id[i] field, an attribute bitdepth[i] field, an attribute_cicp_colour_primaries[i] field, an attribute_cicp_transfer_characteristics[i] field, an attribute_cicp_matrix_coeffs[i] field, an attribute_cicp_video_full_range_flag[i] field, and a known_attribute_label_flag[i] field.

The attribute_dimension[i] field specifies the number of components of the i-th attribute.

The attribute_instance_id[i] field specifies the instance ID of the i-th attribute.

The attribute_bitdepth[i] field specifies the bitdepth of the i-th attribute signal(s).

The attribute_cicp_colour_primaries[i] field indicates chromaticity coordinates of the color attribute source primaries of the i-th attribute.

The attribute_cicp_transfer_characteristics[i] field either indicates the reference opto-electronic transfer characteristic function of the colour attribute as a function of a source input linear optical intensity with a nominal real-valued range of 0 to 1 or indicates the inverse of the reference electro-optical transfer characteristic function as a function of an output linear optical intensity.

The attribute_cicp_matrix_coeffs[i] field describes the matrix coefficients used in deriving luma and chroma signals from the green, blue, and red, or Y, Z, and X primaries.

The attribute_cicp_video_full_range_flag[i] field indicates the black level and range of the luma and chroma signals as derived from E'Y, E'PB, and E'PR or E'R, E'G, and E'B real-valued component signals.

The known_attribute_label_flag[i] field specifies whether a known_attribute_label field or an attribute_label_four bytes field is signaled for the i-th attribute. For example, the value of the known_attribute_label_flag[i] field equal to 0 specifies that the known_attribute_label field is signaled for the i-th attribute. The known_attribute_label_flag[i] field equal to 1 specifies that the attribute_label_four bytes field is signaled for the i-th attribute.

The known_attribute_label[i] field may specify an attribute type. For example, the known_attribute_label[i] field equal to 0 may specify that the i-th attribute is color. The known_attribute_label[i] field equal to 1 specifies that the i-th attribute is reflectance. The known_attribute_label[i] field equal to 2 may specify that the i-th attribute is frame index.

The attribute_label_four_bytes field indicates the known attribute type with a 4-byte code.

In this example, the attribute_label_four_bytes field indicates color when equal to 0 and indicates reflectance when is equal to 1.

According to embodiments, when the sps_extension_present_flag field is equal to 1, the SPS may further include a sps_extension_data_flag field.

The sps_extension_data_flag field may have any value.

FIG. 28 shows a syntax structure of a geometry parameter set (geometry_parameter_set( )) (GPS) according to the present disclosure. The GPS according to the embodiments may include information about a method of encoding geometry information about point cloud data included in one or more slices.

According to embodiments, the GPS may include a gps_geom_parameter_set_id field, a gps_seq_parameter_set_id field, a gps_box_present_flag field, a unique_geometry_points_flag field, a neighbour_context_restriction_flag field, an inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, and a gps_extension_present_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

The unique_geometry_points_flag field indicates whether all output points have unique positions. For example, the unique_geometry_points_flag field equal to 1 indicates that all output points have unique positions. The unique_geometry_points_flag field equal to 0 indicates that in all slices that refer to the current GPS, the two or more of the output points may have the same position.

The neighbor_context_restriction_flag field indicates contexts used for octree occupancy coding. For example, the neighbour_context_restriction_flag field equal to 0 indicates that octree occupancy coding uses contexts determined from six neighboring parent nodes. The neighbour_context_restriction_flag field equal to 1 indicates that octree occupancy coding uses contexts determined from sibling nodes only.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element ocupancy_map. For example, the bitwise_occupancy_coding_flag field equal to 0 indicates that geometry node occupancy is encoded using the dictionary encoded syntax element occupancy byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log 2_neighbour_avail_boundary field specifies the value of the variable NeighbAvailBoundary that is used in the decoding process as follows:

NeighbAvailBoundary=$2^{log2\_neighbour\_avail\_boundary}$

For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes as follows:

TrisoupNodeSize=1<<log 2_trisoup_node_size

The gps_extension_present_flag field specifies whether the gps_extension_data syntax structure is present in the GPS syntax structure. For example, gps_extension_present_flag equal to 1 specifies that the gps_extension_data syntax structure is present in the GPS syntax. For example, gps_extension_present_flag equal to 0 specifies that this syntax structure is not present in the GPS syntax.

When the value of the gps_extension_present_flag field is equal to 1, the GPS according to the embodiments may further include a gps_extension_data_flag field.

The gps_extension_data_flag field may have any value. Its presence and value do not affect the decoder conformance to profiles.

FIG. 29 shows an example of a syntax structure of a geometry parameter set (geometry_parameter_set( )) (GPS) including the inter prediction-related option information according to the embodiments. The name of the signaling information may be understood within the scope of the meaning and function of the signaling information.

In FIG. 29, the gps_geom_parameter_set_id field provides an identifier for the GPS for reference by other syntax elements.

The gps_seq_parameter_set_id field specifies the value of sps_seq_parameter_set_id for the active SPS.

The geom_tree_type field indicates the coding type of geometry information. For example, geom_tree_type equal to 0 may indicate that geometry information (i.e., location information) is coded using an octree, and geom_tree_type equal to 1 may indicate that the information is coded using a predictive tree.

The GPS according to the embodiments may include a motion_block_lpu_split_type field for each LPU.

The motion_block_lpu_split_type field may specify a reference type for performing LPU splitting applied to the frame. For example, among the values of motion_block_lpu_split_type, 0 may indicate radius-based LPU splitting, 1 may indicate azimuth-based LPU splitting, and 2 may indicate elevation (or vertical)-based LPU splitting.

When the value of the motion_block_lpu_split_type field is 0, the GPS may further include a motion_block_lpu_radius field. The motion_block_lpu_radius field may specify a radius that is a reference for LPU splitting applied to the frame.

When the value of the motion_block_lpu_split_type field is 1, the GPS may further include a motion_block_lpu_azimuth field. The motion_block_lpu_azimuth field may specify an azimuth that is a reference for LPU splitting applied to the frame.

When the value of the motion_block_lpu_split_type field is 2, the GPS may further include a motion_block_lpu_elevation field. The motion_block_lpu_elevation field may specify an elevation that is a reference for LPU splitting applied to the frame.

In the present disclosure, the motion_block_lpu_radius, motion_block_lpu_azimuth, and motion_block_lpu_elevation are referred to as reference information for LPU splitting.

The GPS according to the embodiments may include at least one of a motion_block_pu_split_octree_type field, a motion_block_pu_split_type field, a motion_block_pu_radius field, a motion_block_pu_azimuth field, a motion_block_pu_elevation field, a motion_block_pu_min_radius field, a motion_block_pu_min_azimuth field, or a motion_block_minth field for each PU.

For example, when geom_tree_type is equal to 0 (i.e., it indicates that the geometry information (i.e., position information) is coded using an octree), the GPS includes the motion_block_pu_split_octree_type field.

When the geom_tree_type field equal to 1 (i.e., it indicates that the geometry information (i.e., position information) is coded using a predictive tree), the GPS includes the motion_block_pu_split_type field, motion_block_pu_radius field, motion_block_pu_azimuth field, motion_block_min_azi_elevation field, motion_block_muth field, motion_block_radius field, motion_block_pu_min_elevation field is included.

The motion_block_pu_split_octree_type field indicates octree-related reference order type information for dividing into PUs when geometry coding is performed based on an octree. That is, the motion_block_pu_split_octree_type field specifies the reference order type for dividing into PUs when geometry coding is applied based on the octree applied to the frame.

For example, among the values of the motion_block_pu_split_octree_type field, 0 may indicate x→y→z-based splitting application, 1 may indicate x→z→y-based splitting application, and 2 may indicate y→x→z-based splitting application. 3 may indicate y→z→x-based splitting application, 4 may indicate z→x→y-based splitting application, and 5 may indicate z→y→x-based splitting application.

The motion_block_pu_split_type field is referred to as split reference order type information for dividing an LPU into PUs, and may specify a reference type for dividing an LPU into PUs applied to a frame.

For example, among the values of the motion_block_pu_split_type field 0 may indicate radius-based→azimuth-based→elevation-based splitting application, 1 may indicate radius-based→elevation-based→azimuth-based splitting application, and 2 may indicate azimuth-based→radius-based→elevation-based splitting application. 3 may indicate azimuth-based→elevation-based→radius-based splitting application, 4 may indicate elevation-based→radius-based→azimuth-based division application, and 5 may indicate elevation-based→azimuth-based→radius-based splitting application.

The motion_block_pu_radius field may specify a radius that is a reference for PU splitting applied to the frame.

The motion_block_pu_azimuth field may specify an azimuth that is a reference for PU splitting applied to the frame.

The motion_block_pu_elevation field may specify an elevation that is a reference for PU splitting applied to the frame.

In the present disclosure, the motion_block_pu_radius, motion_block_pu_azimuth, and motion_block_pu_elevation are referred to as information used as a reference for splitting into PUs.

The motion_block_pu_min_radius field may specify a minimum radius that is a reference for PU splitting applied to the frame. When the radius of the PU block is less than the minimum radius, no further splitting is performed.

The motion_block_pu_min_azimuth field may specify a minimum azimuth that is a reference for PU splitting applied to the frame. When the azimuth of the PU block is less than the minimum azimuth, no further splitting is performed.

The motion_block_pu_min_elevation field may specify a minimum elevation that is a reference for PU splitting applied to the frame. When the elevation of the PU block is less than the minimum elevation, no further splitting is performed.

In the present disclosure, the motion_block_pu_min_radius, motion_block_pu_min_azimuth, and motion_block_pu_min_elevation are referred to as minimum PU size information.

According to embodiments, the inter-prediction-related option information of FIG. 29 may be included in any position in the GPS of FIG. 28.

FIG. 30 shows a syntax structure of a tile parameter set (tile_parameter_set( )) (TPS) according to an embodiment of the present disclosure. According to embodiments, the TPS may be referred to as a tile inventory. The TPS according to the embodiments includes information related to each tile.

The TPS according to the embodiments includes a num_tiles field.

The num_tiles field indicates the number of tiles signaled for the bitstream. When not present, num_tiles is inferred to be 0.

The TPS according to the embodiments includes an iteration statement repeated as many times as the value of the num_tiles field. In an embodiment, i is initialized to 0, and is incremented by 1 each time the iteration statement is executed. The iteration statement is repeated until the value of i becomes equal to the value of the num_tiles field. The iteration statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, and a tile_bounding_box_size_depth[i] field.

The tile_bounding_box_offset_x[i] field indicates the x offset of the i-th tile in the Cartesian coordinates.

The tile_bounding_box_offset_y[i] field indicates the y offset of the i-th tile in the Cartesian coordinates.

The tile_bounding_box_offset_z[i] field indicates the z offset of the i-th tile in the Cartesian coordinates.

The tile_bounding_box_size_width[i] field indicates the width of the i-th tile in the Cartesian coordinates.

The tile_bounding_box_size_height[i] field indicates the height of the i-th tile in the Cartesian coordinates.

The tile_bounding_box_size_depth[i] field indicates the depth of the i-th tile in the Cartesian coordinates.

FIG. 31 shows an example of a syntax structure of a tile parameter set (tile_parameter_set( )) (TPS) including the inter prediction-related option information according to the embodiments. The name of the signaling information may be understood within the scope of the meaning and function of the signaling information.

In FIG. 31, the num_tiles field, the tile_bounding_box_offset_x[i] field, and the tile_bounding_box_offset_y[i] field are the same as those described with reference to FIG. 30, and thus a description thereof will be skipped below The TPS according to the embodiments may include a motion_block_lpu_split_type field for each LPU.

The motion_block_lpu_split_type field may specify a reference type for performing LPU splitting applied to a tile. For example, among the values of motion_block_lpu_split_type, 0 may indicate radius-based LPU splitting, 1 may indicate azimuth-based LPU splitting, and 2 may indicate elevation-based LPU splitting.

When the value of the motion_block_lpu_split_type field is 0, the TPS may further include a motion_block_lpu_radius field. The motion_block_lpu_radius field may specify a radius that is a reference for LPU splitting applied to the tile.

When the value of the motion_block_lpu_split_type field is 1, the TPS may further include a motion_block_lpu_azimuth field. The motion_block_lpu_azimuth field may specify an azimuth that is a reference for LPU splitting applied to the tile.

When the value of the motion_block_lpu_split_type field is 2, the TPS may further include a motion_block_lpu_elevation field. The motion_block_lpu_elevation field may specify an elevation that is a reference for LPU splitting applied to the tile.

In the present disclosure, the motion_block_lpu_radius, motion_block_lpu_azimuth, and motion_block_lpu_elevation are referred to as reference information for LPU splitting.

The TPS according to the embodiments may include at least one of a motion_block_pu_split_octree_type field, a motion_block_pu_split_type field, a motion_block_pu_radius field, a motion_block_pu_azimuth field, a motion_block_pu_elevation field, a motion_block_pu_min_radius field, a motion_block_pu_min_azimuth field, or a motion_block_minth field for each PU.

For example, when geom_tree_type is equal to 0 (i.e., it indicates that the geometry information (i.e., position information) is coded using an octree), the TPS includes the motion_block_pu_split_octree_type field.

When the geom_tree_type field equal to 1 (i.e., it indicates that the geometry information (i.e., position information) is coded using a predictive tree), the TPS includes the motion_block_pu_split_type field, motion_block_pu_radius field, motion_block_pu_azimuth field, motion_block_min_azi_elevation field, motion_block_muth field, motion_block_radius field, motion_block_pu_min_elevation field is included.

The motion_block_pu_split_octree_type field indicates octree-related reference order type information for dividing into PUs when geometry coding is performed based on an octree. That is, the motion_block_pu_split_octree_type field specifies the reference order type for dividing into PUs when geometry coding is applied based on the octree applied to the tile.

For example, among the values of the motion_block_pu_split_octree_type field, 0 may indicate x→y→z-based splitting application, 1 may indicate x→z→y-based splitting application, and 2 may indicate y→x→z-based splitting application. 3 may indicate y→z→x-based splitting application, 4 may indicate z→x→y-based splitting application, and 5 may indicate z→y→x-based splitting application.

The motion_block_pu_split_type field is referred to as split reference order type information for dividing an LPU into PUs, and may specify a reference type for dividing an LPU into PUs applied to a frame.

For example, among the values of the motion_block_pu_split_type field 0 may indicate radius-based→azimuth-based→elevation-based splitting application, 1 may indicate radius-based→elevation-based→azimuth-based splitting application, and 2 may indicate azimuth-based→radius-based→elevation-based splitting application. 3 may indicate azimuth-based→elevation-based→radius-based splitting application, 4 may indicate elevation-based→radius-based→azimuth-based division application, and 5 may indicate elevation-based→azimuth-based→radius-based splitting application.

The motion_block_pu_radius field may specify a radius that is a reference for PU splitting applied to the tile.

The motion_block_pu_azimuth field may specify an azimuth that is a reference for PU splitting applied to the tile.

The motion_block_pu_elevation field may specify an elevation that is a reference for PU splitting applied to the tile.

In the present disclosure, the motion_block_pu_radius, motion_block_pu_azimuth, and motion_block_pu_elevation are referred to as information used as a reference for splitting into PUs.

The motion_block_pu_min_radius field may specify a minimum radius that is a reference for PU splitting applied to the tile. When the radius of the PU block is less than the minimum radius, no further splitting is performed.

The motion_block_pu_min_azimuth field may specify a minimum azimuth that is a reference for PU splitting applied to the tile. When the azimuth of the PU block is less than the minimum azimuth, no further splitting is performed.

The motion_block_pu_min_elevation field may specify a minimum elevation that is a reference for PU splitting applied to the tile. When the elevation of the PU block is less than the minimum elevation, no further splitting is performed.

In the present disclosure, the motion_block_pu_min_radius, motion_block_pu_min_azimuth, and motion_block_pu_min_elevation are referred to as minimum PU size information.

According to embodiments, the inter-prediction-related option information of FIG. 31 may be included in any position in the TPS of FIG. 30.

FIG. 32 shows an embodiment of a syntax structure of a geometry slice bitstream( ) according to the present disclosure.

The geometry slice bitstream (geometry_slice_bitstream ( )) according to the embodiments may include a geometry slice header (geometry_slice_header( )) and geometry slice data (geometry_slice_data( )).

FIG. 33 shows an embodiment of a syntax structure of the geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to embodiments may include a gsh_geom_parameter_set_id field, a gsh_tile_id field, a gsh_slice_id field, a gsh_max_node_size_log 2 field, a gsh_num_points field, and a byte_alignment( ) field.

When the value of the gps_box_present_flag field included in the GPS is 'true' (e.g., 1), and the value of the gps_gsh_box_log 2_scale_present_flag field is 'true' (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

The gsh_geom_parameter_set_id field specifies the value of the gps_geom_parameter_set_id of the active GPS.

The gsh_tile_id field specifies the value of the tile id that is referred to by the GSH.

The gsh_slice_id specifies id of the slice for reference by other syntax elements.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

The gsh_max_node_size_log 2 field specifies a size of a root geometry octree node.

The gsh_points_number field specifies the number of coded points in the slice.

FIG. 34 shows an example of a syntax structure of geometry_slice_header( ) including the inter prediction-related option information according to the embodiments. The name of the signaling information may be understood within the scope of the meaning and function of the signaling information.

A bitstream transmitted by the transmission device (or a bitstream received by the reception device) according to embodiments may include one or more slices.

In FIG. 34, the gsh_geometry_parameter_set_id field, the gsh_tile_id field, and the gsh_slice_id field are the same as those of FIG. 33, thus a description thereof will be skipped to avoid redundant description.

The geometry slice header according to the embodiments may include a motion_block_lpu_split_type field for each LPU.

The motion_block_lpu_split_type field may specify a reference type for performing LPU splitting applied to a slice. For example, among the values of motion_block_lpu_split_type, 0 may indicate radius-based LPU splitting, 1 may indicate azimuth-based LPU splitting, and 2 may indicate elevation-based LPU splitting.

When the value of the motion_block_lpu_split_type field is 0, the geometry slice header may further include a motion_block_lpu_radius field. The motion_block_lpu_radius field may specify a radius that is a reference for LPU splitting applied to the slice.

When the value of the motion_block_lpu_split_type field is 1, the geometry slice header may further include a motion_block_lpu_azimuth field. The motion_block_lpu_azimuth field may specify an azimuth that is a reference for LPU splitting applied to the slice.

When the value of the motion_block_lpu_split_type field is 2, the geometry slice header may further include a motion_block_lpu_elevation field. The motion_block_lpu_elevation field may specify an elevation that is a reference for LPU splitting applied to the slice.

In the present disclosure, the motion_block_lpu_radius, motion_block_lpu_azimuth, and motion_block_lpu_elevation are referred to as reference information for LPU splitting.

The geometry slice header according to the embodiments may include at least one of a motion_block_pu_split_octree_type field, a motion_block_pu_split_type field, a motion_block_pu_radius field, a motion_block_pu_azimuth field, a motion_block_pu_elevation field, a motion_block_pu_min_radius field, a motion_block_pu_min_azimuth field, or a motion_block_minth field for each PU.

For example, when geom_tree_type is equal to 0 (i.e., it indicates that the geometry information (i.e., position information) is coded using an octree), the geometry slice header includes the motion_block_pu_split_octree_type field.

When the geom_tree_type field equal to 1 (i.e., it indicates that the geometry information (i.e., position information) is coded using a predictive tree), the geometry slice header includes the motion_block_pu_split_type field, motion_block_pu_radius field, motion_block_pu_azimuth field, motion_block_min_azi_elevation field, motion_block_muth field, motion_block_radius field, motion_block_pu_min_elevation field is included.

The motion_block_pu_split_octree_type field indicates octree-related reference order type information for dividing into PUs when geometry coding is performed based on an octree. That is, the motion_block_pu_split_octree_type field specifies the reference order type for dividing into PUs when geometry coding is applied based on the octree applied to the tile.

For example, among the values of the motion_block_pu_split_octree_type field, 0 may indicate x→y→z-based splitting application, 1 may indicate x→z→y-based splitting application, and 2 may indicate y→x→z-based splitting application. 3 may indicate y→z→x-based splitting application, 4 may indicate z→x→y-based splitting application, and 5 may indicate z→y→x-based splitting application.

The motion_block_pu_split_type field is referred to as split reference order type information for dividing an LPU into PUs, and may specify a reference type for dividing an LPU into PUs applied to a frame.

For example, among the values of the motion_block_pu_split_type field 0 may indicate radius-based→azimuth-based→elevation-based splitting application, 1 may indicate radius-based→elevation-based→azimuth-based splitting application, and 2 may indicate azimuth-based→radius-based→elevation-based splitting application. 3 may indicate azimuth-based→elevation-based→radius-based splitting application, 4 may indicate elevation-based→radius-based→azimuth-based division application, and 5 may indicate elevation-based→azimuth-based→radius-based splitting application.

The motion_block_pu_radius field may specify a radius that is a reference for PU splitting applied to the slice.

The motion_block_pu_azimuth field may specify an azimuth that is a reference for PU splitting applied to the slice.

The motion_block_pu_elevation field may specify an elevation that is a reference for PU splitting applied to the slice.

In the present disclosure, the motion_block_pu_radius, motion_block_pu_azimuth, and motion_block_pu_elevation are referred to as information used as a reference for splitting into PUs.

The motion_block_pu_min_radius field may specify a minimum radius that is a reference for PU splitting applied to the slice. When the radius of the PU block is less than the minimum radius, no further splitting is performed.

The motion_block_pu_min_azimuth field may specify a minimum azimuth that is a reference for PU splitting applied to the slice. When the azimuth of the PU block is less than the minimum azimuth, no further splitting is performed.

The motion_block_pu_min_elevation field may specify a minimum elevation that is a reference for PU splitting applied to the slice. When the elevation of the PU block is less than the minimum elevation, no further splitting is performed.

In the present disclosure, the motion_block_pu_min_radius, motion_block_pu_min_azimuth, and motion_block_pu_min_elevation are referred to as minimum PU size information.

According to embodiments, the inter-prediction-related option information of FIG. 34 may be included in any position in the geometry slice header of FIG. 33.

According to embodiments, a slice may be split into one or more PUs. For example, a geometry slice may be composed of a geometry slice header and one or more geometry PUs. In this case, each geometry PU may be composed of a geometry PU header and geometry PU data.

FIG. 35 shows an example of a syntax structure of a geometry PU header (geom_pu_header( )) including the inter prediction-related option information according to the embodiments. The name of the signaling information may be understood within the scope of the meaning and function of the signaling information.

The geometry PU header according to the embodiments may include a pu_tile_id field, a pu_slice_id field, and a pu_cnt field.

The pu_tile_id field specifies a tile identifier (ID) for identifying the tile to which the PU belongs.

The pu_slice_id field specifies a slice identifier (ID) for identifying the slice to which the PU belongs.

The pu_cnt field specifies the number of PUs included in the slice identified by the value of the pu_slice_id field.

The geometry PU header according to the embodiments includes a loop that is iterated as many times as the value of the pu_cnt field. In an embodiment, puIdx is initialized to 0, implemented by 1 each time the loop is executed, and the loop iterates until the value of puIdx reaches the value of the pu_cnt field. The loop may include a pu_id[puIdx] field, a pu_split_flag[puIdx] field, a pu_motion_compensation_type [puIdx] field, and a pu_has_motion_vector_flag[puIdx] field.

The pu_id[puIdx] field specifies a PU identifier (ID) for identifying a PU corresponding to puIdx among the PUs included in the slice.

The pu_split_flag[puIdx] field specifies whether a PU corresponding to puIdx among the PUs included in the slice is further split afterward.

The pu_motion_compensation_type[puIdx] field specifies whether a motion vector is applied to a PU corresponding to puIdx among the PUs included in the slice. According to embodiments, the pu_motion_compensation_type[puIdx] field may specify whether a global motion vector is applied to the PU corresponding to puIdx among the PUs included in the slice. According to embodiments, the pu_motion_compensation_type[puIdx] field may specify whether a local motion vector is applied to the PU corresponding to puIdx among the PUs included in the slice. According to embodiments, the pu_motion_compensation_type[puIdx] field may specify that the motion vector is not applied to the PU corresponding to puIdx among the PUs included in the slice. For example, among the values of pu_motion_compensation_type[puIdx], 0 may indicate that no motion vector is applied to the PU, 1 may indicate that the global motion vector is applied, and 2 may indicate that the local motion vector is applied.

Accordingly, when the value of the pu_motion_compensation_type[puIdx] field is 0, the geometry decoder at the receiving side may identify that the global motion vector is not applied to the PU. When the value is 1, the decoder may identify that the global motion vector is applied to the PU. Therefore, when the value of the pu_motion_compensation_type[puIdx] field is 1, motion compensation may be performed by applying the global motion vector to the PU. That is, when the value of the pu_motion_compensation_type [puIdx] field is 0, the motion compensation application unit of the geometry decoder at the receiving side may use the points of the previous frame. When the value is 1, the motion compensation application unit may select points for which the global motion vector is applied to the PU and perform motion compensation. When the value is 2, the application unit may select points for which a local motion vector is applied to the corresponding PU and perform motion compensation.

The pu_has_motion_vector_flag[puIdx] field specifies whether the PU corresponding to puIdx among the PUs included in the slice has a motion vector. That is, the pu_has_motion_vector_flag[puIdx] field may specify whether a motion vector applicable to the PU corresponding to puIdx among the PUs included in the slice is present.

For example, when the value of the pu_has_motion_vector_flag[puIdx] field is 1, it may indicate that the PU has an applicable motion vector. When the value is 0, it may indicate that the PU does not have an applicable motion vector.

According to embodiments, when the value of the pu_has_motion_vector_flag[puIdx] field is 1, it indicates that the PU identified by the value of the pu_id[puIdx] field has an applicable motion vector. In this case, the geometry PU header may further include a pu_motion_vector_xyz [pu_id][k] field.

The pu_motion_vector_xyz[pu_id][k] field may specify a motion vector applied to the k-th PU identified by the pu_id field.

FIG. 36 shows a syntax structure of an attribute slice bitstream( ) according to an embodiment of the present disclosure.

The attribute slice bitstream (attribute_slice_bitstream( )) according to the embodiments may include an attribute slice header (attribute_slice_header( )) and attribute slice data (attribute_slice_data( )).

FIG. 37 shows a syntax structure of an attribute slice header (attribute_slice_header( )) according to an embodiment of the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field in the APS is TRUE (e.g., 1), the attribute slice header (attribute_slice_header( )) according to the embodiments may further include an ash_attr_qp_delta_luma field. When the value of attribute_dimension_minus1 [Oash_dimension_ minus1] is greater than 0, the attribute slice header may further include an ash_attr_qp_delta_chroma field.

The ash_attr_parameter_set_id field indicates the value of the aps_attr_parameter_set_id field in the current active APS.

The ash_attr_sps_attr_idx field indicates an attribute set in the current active SPS.

The ash_attr_geom_slice_id field indicates the value of the gsh_slice_id field in the current geometry slice header.

The ash_attr_qp_delta_luma field indicates a luma delta quantization parameter qp derived from the initial slice qp in the active attribute parameter set.

The ash_attr_qp_delta_chroma field indicates a chroma delta quantization parameter qp derived from the initial slice qp in the active attribute parameter set.

In this regard, the variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present_flag field indicates whether the ash_attr_layer_qp_delta_luma field and the ash_attr_layer_qp_delta_chroma field are present in the attribute slice header (ASH) for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

The ash_attr_num_layer_qp_minus1 field plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 0 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop incremented until the value of i reaches the value of NumLayerQp. This loop contains an ash_attr_layer_qp_delta_luma[i] field. Also, when the value of the attribute_dimension_minus1[ash_attr_sps_attr_idx] field is greater than 0, the loop may further include an ash_attr_layer_qp_delta_chroma[i] field.

The ash_attr_layer_qp_delta_luma field indicates a luma delta quantization parameter (qp) from InitialSliceQpY in each layer.

The ash_attr_layer_qp_delta_chroma field indicates a chroma delta quantization parameter (qp) from InitialSliceQpC in each layer.

The variables SliceQpY[i] and SliceQpC[i] with i=0 . . . NumLayerQPNumQPLayer−1 are derived as follows.

```
for (i = 0; i<NumLayerQPNumQPLayer; i++) {
    SliceQpY[i] = Initial SliceQpY + ash_attr_layer_qp_delta_luma[i]
    SliceQpC[i] = Initial SliceQpC + ash_attr_layer_qp_delta_chroma[i]
}
```

When the value of the ash_attr_region_qp_delta_present_flag field is 1, the attribute slice header (attribute_slice_header( )) according to the embodiments indicates that ash_attr_region_qp_delta, region bounding box origin, and size are present in the current attribute slice header. When the value of the ash_attr_region_qp_delta_present_flag field is 0, it indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

As described above, when a point cloud is captured by LiDAR equipment in a moving/or stationary vehicle, the angular mode (r, φ, i) may be used. In this case, as the radius r increases for the same azimuth, the arc may increase. Therefore, small movements of objects close to the vehicle appear to be large and are very likely to be local motion vectors. In the case of objects far away from the vehicle, even the same motion as that of objects close to the vehicle may not be revealed, and thus are very likely to be covered with a global motion vector without a local motion vector. Also, moving objects are very likely to be split into PUs according to the main region where the objects are captured.

In order to apply the inter-prediction compression technology through the reference frame to the point cloud having such characteristics, the present disclosure supports a method of splitting into LPU/PUs, which are prediction units, by reflecting the characteristics of the content.

Therefore, in the present disclosure, the encoding execution time may be reduced by expanding the region predictable by the local motion vector such that additional calculations are not required. In addition, the compression efficiency for inter-prediction of point cloud data may be improved as PU splitting is performed to obtain the effect of separating objects even though moving objects are not split accurately.

In this way, the transmission method/device may efficiently compress the point cloud data to transmit the data, and transmit signaling information therefor. Thus, the reception method/device may also efficiently decode/reconstruct the point cloud data.

The point cloud data transmission method, the point cloud data transmission device, the point cloud data reception method, and the reception device according to the embodiments may provide a quality point cloud service.

The point cloud data transmission method, point cloud data transmission device, point cloud data reception method, and point cloud data reception device according to embodiments may achieve various video codec methods.

The point cloud data transmission method, point cloud data transmission device, point cloud data reception method, and point cloud data reception device according to embodiments may provide universal point cloud content such as an autonomous driving service.

The point cloud data transmission method, point cloud data transmission device, point cloud data reception method, and point cloud data reception device according to embodiments may perform space-adaptive partition of point cloud data for independent encoding and decoding of the point cloud data, thereby improving parallel processing and providing scalability.

The point cloud data transmission method, point cloud data transmission device, point cloud data reception method, and point cloud data reception device according to embodiments may perform encoding and decoding by partitioning the point cloud data in units of tiles and/or slices, and signal necessary data therefor, thereby improving encoding and decoding performance of the point cloud.

The point cloud data transmission method, point cloud data transmission device, point cloud data reception method, and point cloud data reception device according to embodiments may reflect the characteristics of content to split the point cloud data into LPUs/PUs, which are prediction units. Accordingly, compression technology based on inter-prediction through a reference frame may be applied to a point cloud captured by LiDAR and having multiple frames. Thereby, the time required for encoding point cloud data may be reduced by expanding the region predictable by the local motion vector such that no additional calculation is required.

The point cloud data transmission method, point cloud data transmission device, point cloud data reception method, and point cloud data reception device according to embodiments may split the point cloud data into one or more prediction units based on elevation (or vertical), and then signal whether to apply a motion vector for each split prediction unit. Thereby, the size of the bitstream of the geometry information may be reduced, and thus real-time point cloud data capture/compression/transmission/reconstruction/playback services may be efficiently supported.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Operations according to the embodiments described in this specification may be performed by a transmission/reception device including one or more memories and/or one or more processors according to embodiments. The one or more memories may store programs for processing/controlling the operations according to the embodiments, and the one or more processors may control various operations described in this specification. The one or more processors may be referred to as a controller or the like. In embodiments, operations may be performed by firmware, software, and/or combinations thereof. The firmware, software, and/or combinations thereof may be stored in the processor or the memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise. The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition. Embodiments may include variations/modifications within the scope of the claims and their equivalents. It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A method of transmitting point cloud data, the method comprising:
   encoding geometry data of the point cloud data in an angular mode, wherein the angular mode is represented in (r, φ, i) coordinates and wherein r is radius, φ is azimuth, and i is laser ID;
   encoding attribute data of the point cloud data based on the geometry data; and
   transmitting the encoded geometry data, the encoded attribute data and signaling data,
   wherein the point cloud data is captured by a LiDAR including one or more lasers,
   wherein the encoding geometry data includes:
     transforming a coordinate system of the geometry data from (x, y, z) coordinates to (r, φ, i) coordinates,
     partitioning the geometry data that the coordinate system is transformed into blocks for motion compensation based on a partition method, and
     inter-prediction encoding the geometry data by selectively applying the motion compensation to each of the blocks,
   wherein the signaling data includes information for identifying the partition method and information for identifying a size of a block that is partitioned based on the partition method, and
   wherein the signaling data further includes information that is repeated as many as a number of blocks and the information indicates whether the motion compensation is applied to a corresponding block.

2. The method of claim 1,
   wherein the motion compensation is performed based on a global motion vector obtained by estimating motion between consecutive frames.

3. The method of claim 1,
   wherein the signaling data further includes information for identifying the number of blocks.

4. A device for transmitting point cloud data, the device comprising:
   a geometry encoder to encode geometry data of the point cloud data in an angular mode, wherein the angular mode is represented in (r, φ, i) coordinates and wherein r is radius, φ is azimuth, and i is laser ID;
   an attribute encoder to encode attribute data of the point cloud data based on the geometry data; and
   a transmitter to transmit the encoded geometry data, the encoded attribute data and signaling data,
   wherein the point cloud data is captured by a LiDAR including one or more lasers,
   wherein the geometry encoder includes:
     a coordinate transformer to transform a coordinate system of the geometry data from (x, y, z) coordinates to (r, φ, i) coordinates,
     a splitter to partition the geometry data that the coordinate system is transformed into blocks for motion compensation based on a partition method, and
     an inter-predictor to inter-prediction-encode the geometry data by selectively applying the motion compensation to each of the blocks,
   wherein the signaling data includes information for identifying the partition method and information for identifying a size of a block that is partitioned based on the partition method, and
   wherein the signaling data further includes information that is repeated as many as a number of blocks and the information indicates whether the motion compensation is applied to a corresponding block.

5. The device of claim 4,
   wherein the motion compensation is performed based on a global motion vector obtained by estimating motion between consecutive frames.

6. The device of claim 4,
   wherein the signaling data further includes information for identifying the number of blocks.

7. A method of receiving point cloud data, the method comprising:
   receiving geometry data, attribute data, and signaling data;
   decoding the geometry data based on the signaling data in an angular mode, wherein the angular mode is represented in (r, φ, i) coordinates and wherein r is radius, φ is azimuth, and i is laser ID;
   decoding the attribute data based on the signaling data and the decoded geometry data; and
   rendering the point cloud data derived based on the decoded geometry data and the decoded attribute data,
   wherein the point cloud data is captured by a LiDAR including one or more lasers at a transmitting side,
   wherein the decoding geometry data includes:
     partitioning reference data for the geometry data into blocks for motion compensation based on a partition method in the signaling data,
     inter prediction decoding the geometry data by selectively applying the motion compensation to each of the blocks based on the signaling data, and
     inverse transforming a coordinate system of the geometry data from (r, φ, i) coordinates to (x, y, z) coordinates,
   wherein the signaling data includes information for identifying the partition method and information for identifying a size of a block that is partitioned based on the partition method, and
   wherein the signaling data further includes information that is repeated as many as a number of blocks and the information indicates whether the motion compensation is applied to a corresponding block.

8. The method of claim 7,
   wherein the motion compensation is performed based on a global motion vector obtained by estimating motion between consecutive frames at a transmitting side.

9. The method of claim 7,
   wherein the signaling data further includes information for identifying the number of blocks.

10. A device for receiving point cloud data, the device comprising:
   a receiver to receive geometry data, attribute data, and signaling data;
   a geometry decoder to decode the geometry data based on the signaling data in an angular mode, wherein the angular mode is represented in (r, φ, i) coordinates and wherein r is radius, φ is azimuth, and i is laser ID;

an attribute decoder to decode the attribute data based on the signaling data and the decoded geometry data; and a renderer to render the point cloud data derived based on the decoded geometry data and the decoded attribute data, wherein the point cloud data is captured by a LiDAR including one or more lasers at a transmitting side, wherein the geometry decoder includes:

a splitter to partition reference data for the geometry data into blocks for motion compensation based on a partition method in the signaling data, an inter predictor to inter prediction decode the geometry data by selectively applying the motion compensation to each of the blocks based on the signaling data, and an inverse coordinate transformer to inverse transform a coordinate system of the geometry data from (r, φ, i) coordinates to (x, y, z) coordinates, wherein the signaling data includes information for identifying the partition method and information for identifying a size of a block that is partitioned based on the partition method, and wherein the signaling data further includes information that is repeated as many as a number of blocks and the information indicates whether the motion compensation is applied to a corresponding block.

11. The device of claim 10, wherein the motion compensation is performed based on a global motion vector obtained by estimating motion between consecutive frames at a transmitting side.

12. The device of claim 10, wherein the signaling data further includes information for identifying the number of blocks.

* * * * *